United States Patent
Lish et al.

(10) Patent No.: US 9,823,431 B2
(45) Date of Patent: Nov. 21, 2017

(54) RAPID DEPLOY OUTDOOR CABLE

(71) Applicant: Google Inc., Mountain View, CA (US)

(72) Inventors: David Frank Lish, Burlingame, CA (US); Ben Warren Segura, Morgan Hill, CA (US); David Anthony, Sunnyvale, CA (US); John Toccalino, Los Altos, CA (US); Paul Steven Rader, Greenwood, MO (US); David Miles, San Jose, CA (US)

(73) Assignee: Google LLC, Mountain View, CA (US)

( * ) Notice: Subject to any disclaimer, the term of this patent is extended or adjusted under 35 U.S.C. 154(b) by 55 days.

(21) Appl. No.: 14/730,791

(22) Filed: Jun. 4, 2015

(65) Prior Publication Data

US 2016/0356975 A1    Dec. 8, 2016

(51) Int. Cl.
*G02B 6/44*    (2006.01)
*G02B 6/46*    (2006.01)

(52) U.S. Cl.
CPC ......... *G02B 6/4407* (2013.01); *G02B 6/4432* (2013.01); *G02B 6/4463* (2013.01); *G02B 6/4495* (2013.01); *G02B 6/4403* (2013.01); *G02B 6/4464* (2013.01); *G02B 6/46* (2013.01)

(58) Field of Classification Search
None
See application file for complete search history.

(56) References Cited

U.S. PATENT DOCUMENTS

| | | | | |
|---|---|---|---|---|
| 4,401,361 A | * | 8/1983 | Slaughter | G02B 6/4403 385/102 |
| 5,668,912 A | * | 9/1997 | Keller | G02B 6/4403 385/100 |
| 5,970,196 A | * | 10/1999 | Greveling | G02B 6/4404 385/100 |
| 7,187,830 B2 | * | 3/2007 | Blazer | G02B 6/4404 385/100 |
| 7,218,821 B2 | | 5/2007 | Bocanegra et al. | |
| 7,272,282 B1 | * | 9/2007 | Seddon | G02B 6/4475 385/100 |
| 7,415,181 B2 | * | 8/2008 | Greenwood | G02B 6/4404 385/100 |
| 8,498,509 B2 | * | 7/2013 | Tatat | G02B 6/4403 385/100 |
| 8,682,124 B2 | * | 3/2014 | Logan | G02B 6/4495 385/100 |
| 2002/0122639 A1 | * | 9/2002 | Le Noane | G02B 6/4426 385/111 |
| 2003/0059181 A1 | * | 3/2003 | Jackman | H01B 11/22 385/102 |
| 2006/0045443 A1 | * | 3/2006 | Blazer | G02B 6/4404 385/114 |
| 2006/0127016 A1 | | 6/2006 | Baird et al. | |

(Continued)

OTHER PUBLICATIONS

International Search Report and Written Opinion for PCT Application No. PCT/US2016/034116, dated Aug. 30, 2016.

*Primary Examiner* — Tina Wong
(74) *Attorney, Agent, or Firm* — Lerner, David, Littenberg, Krumholz & Mentlik, LLP

(57) ABSTRACT

Aspects of this disclosure relate to a cable that includes an outer housing, a plurality of optical fibers within the outer housing and arranged side-by-side along the width of the cable; and a removably attached access layer within the outer housing.

20 Claims, 17 Drawing Sheets

(56) References Cited

U.S. PATENT DOCUMENTS

| | | |
|---|---|---|
| 2011/0217010 A1 | 9/2011 | Kachmar |
| 2012/0281958 A1* | 11/2012 | Petersen .................. H02G 3/32 |
| | | 385/135 |
| 2013/0025929 A1 | 1/2013 | Dower et al. |
| 2013/0094821 A1 | 4/2013 | Logan |
| 2013/0094823 A1* | 4/2013 | Gimblet ............... G02B 6/4434 |
| | | 385/113 |
| 2014/0153893 A1 | 6/2014 | Berglund et al. |
| 2015/0131953 A1* | 5/2015 | Larson ................. G02B 6/4441 |
| | | 385/109 |

* cited by examiner

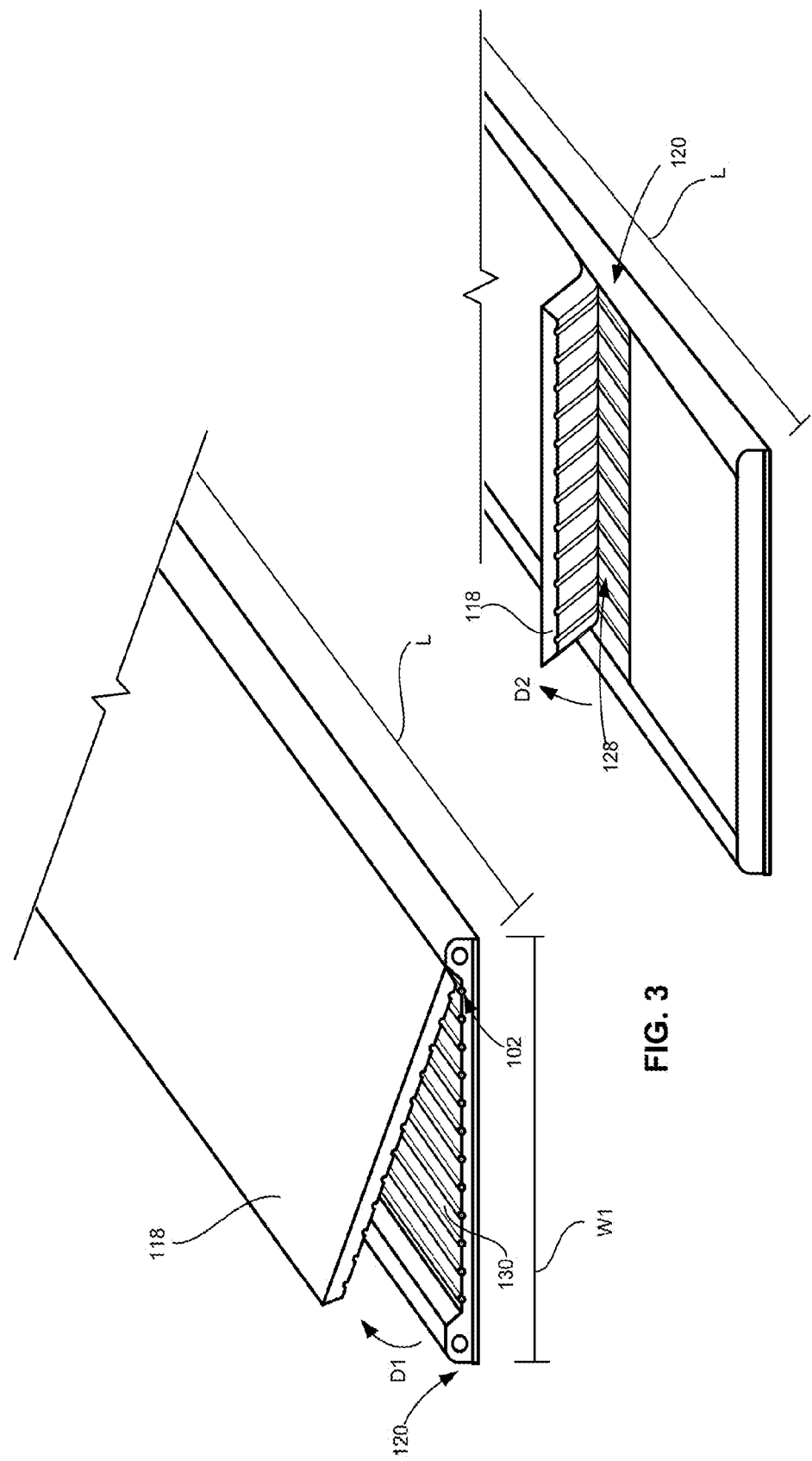

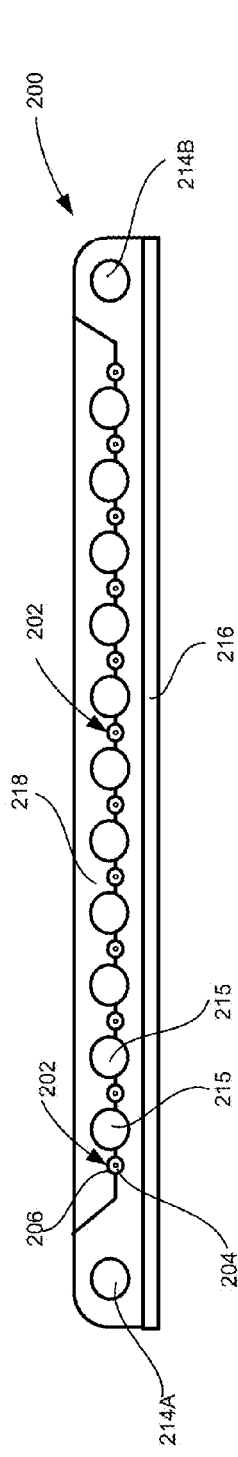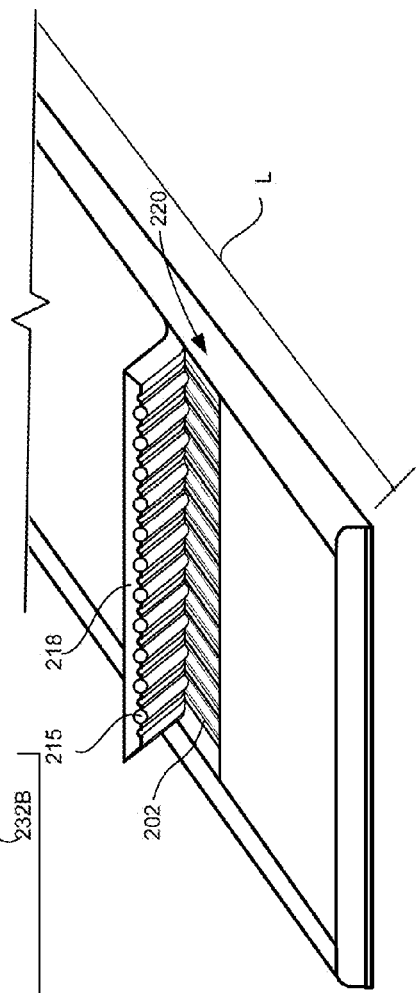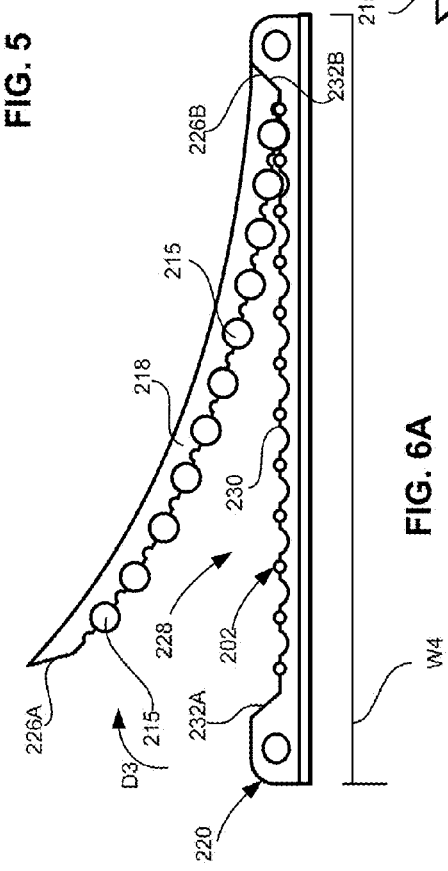

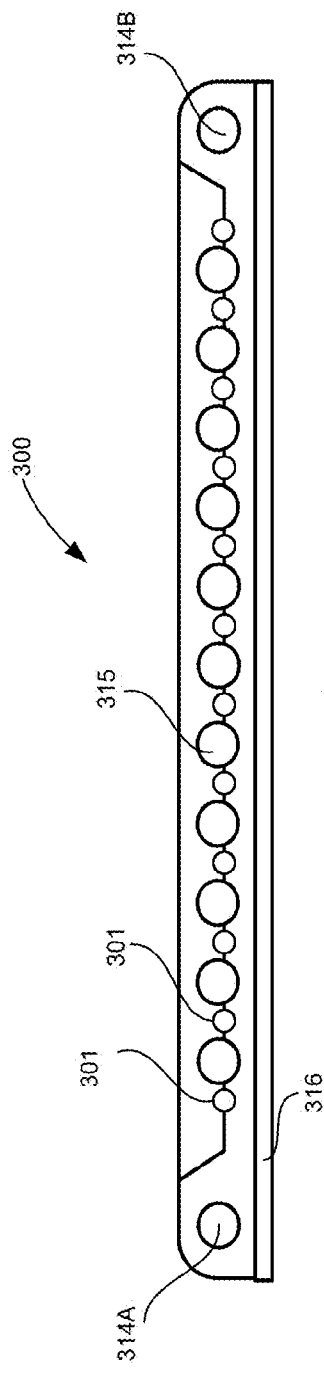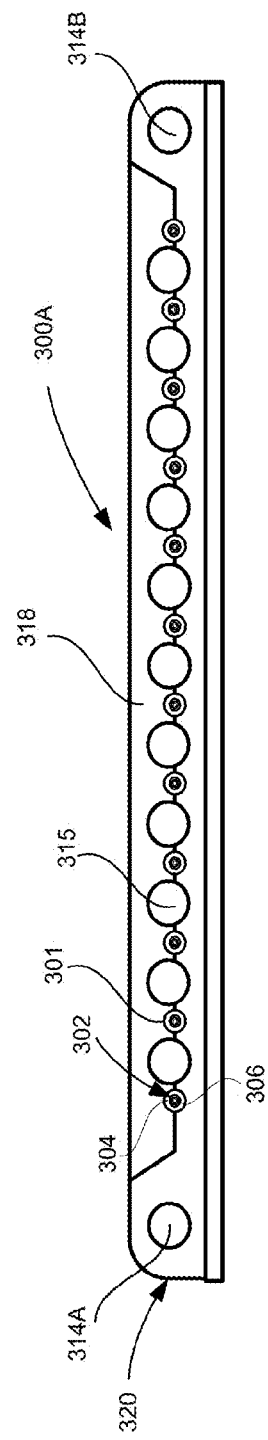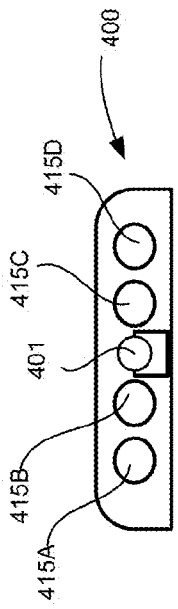

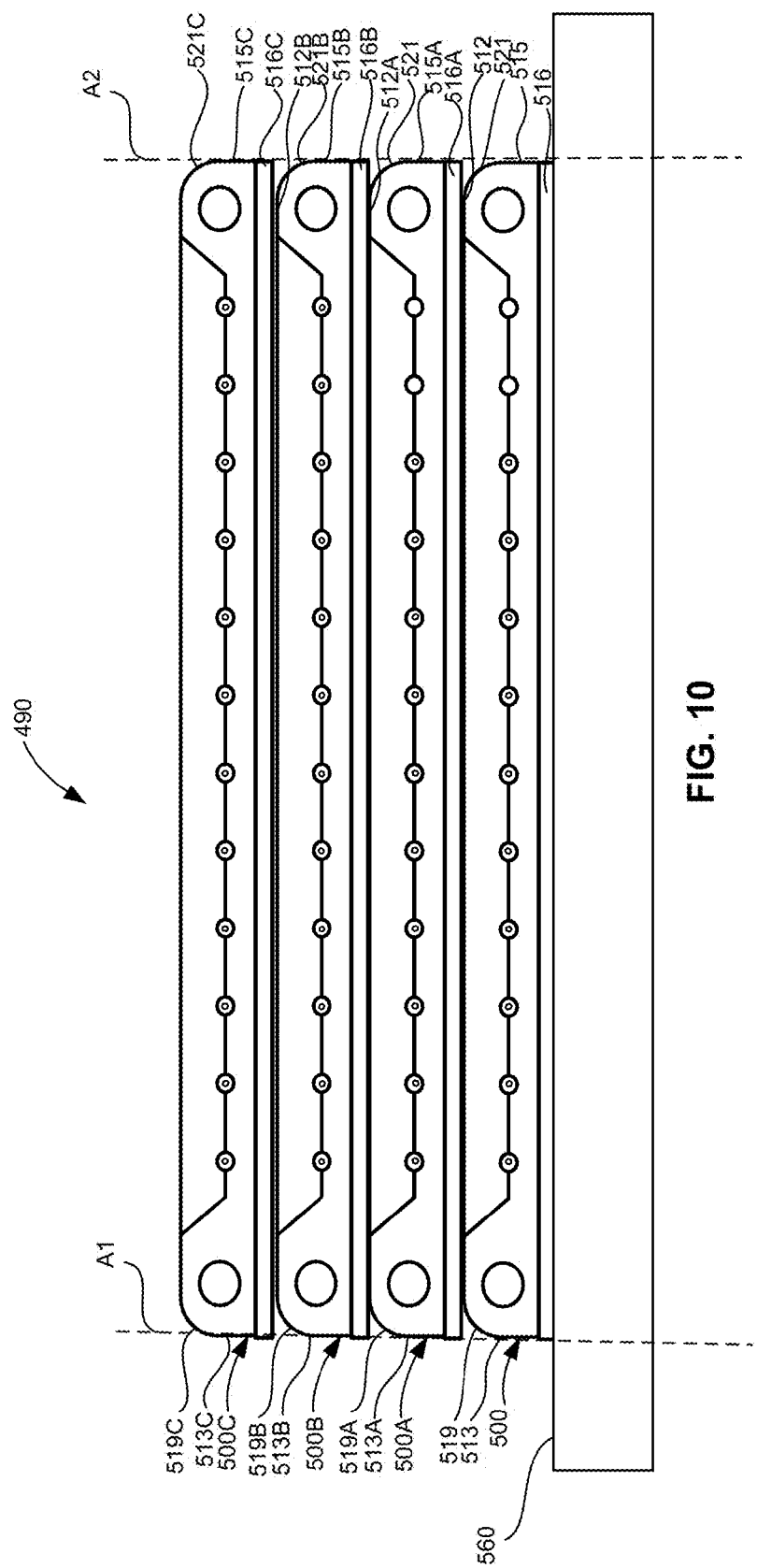

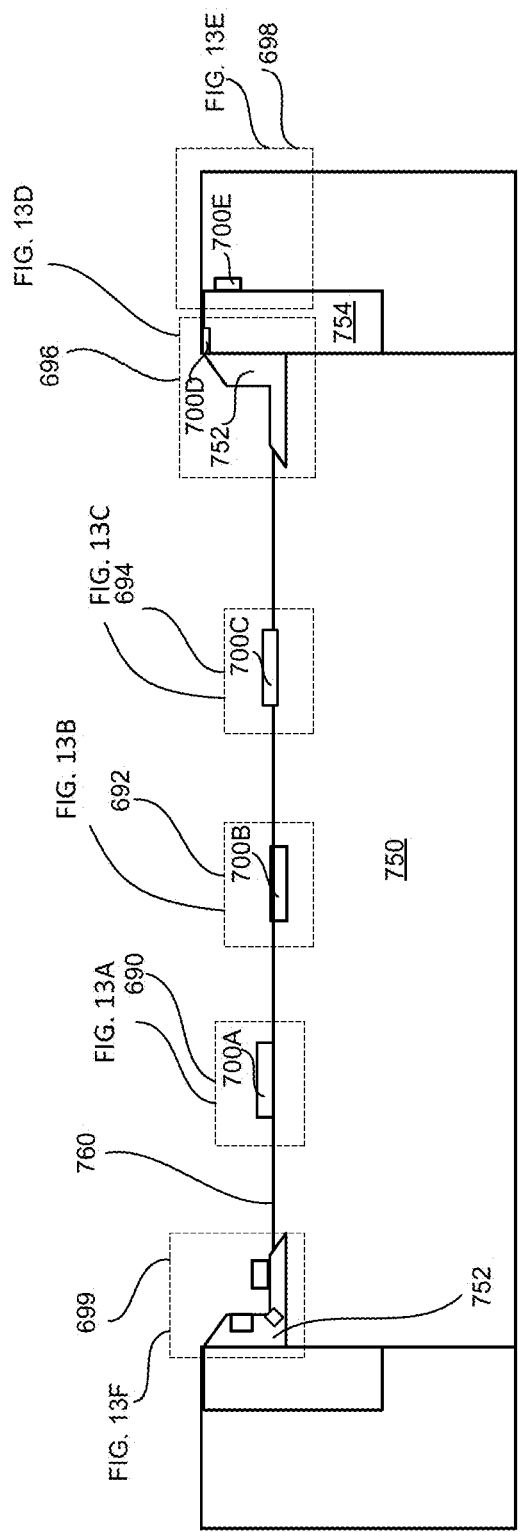

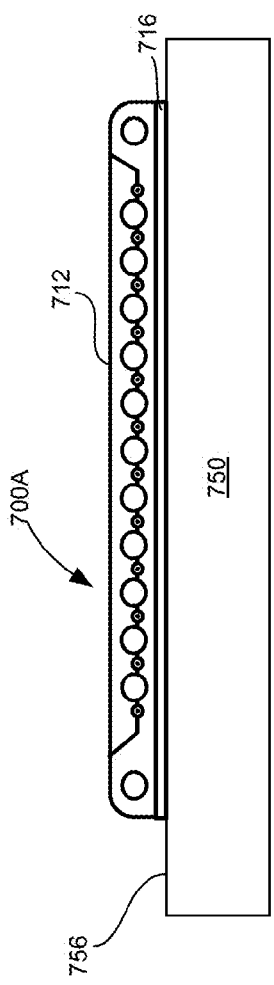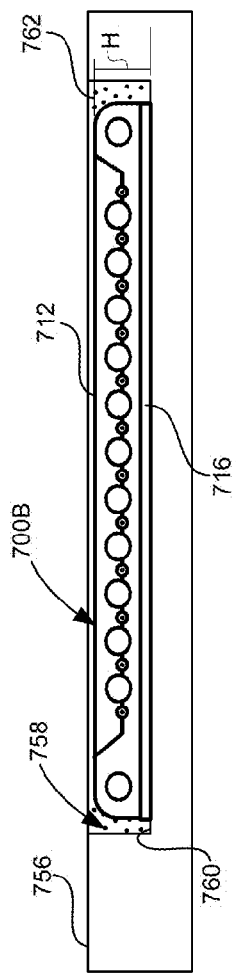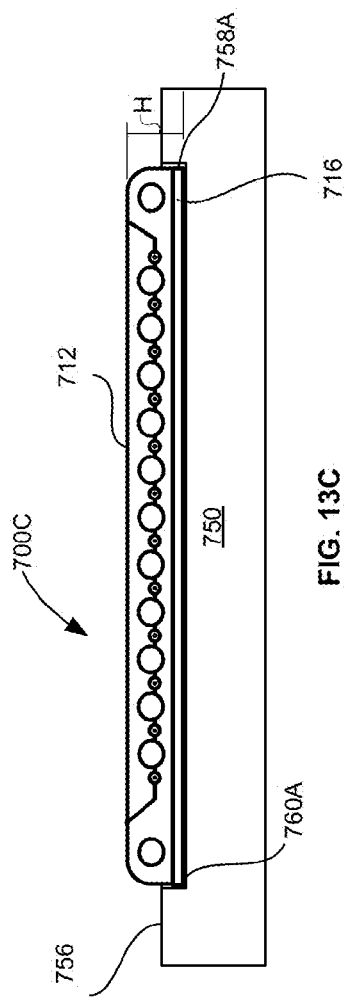

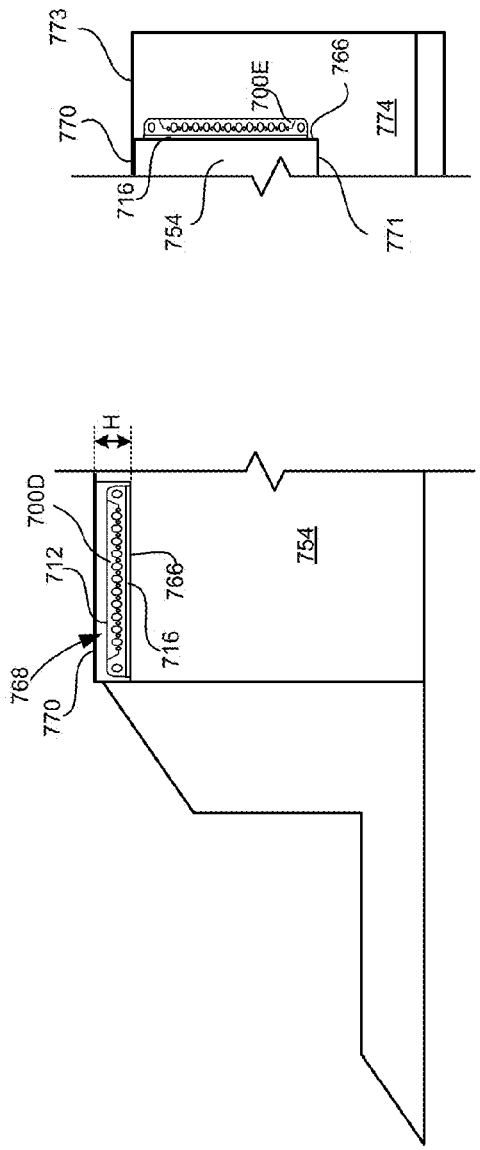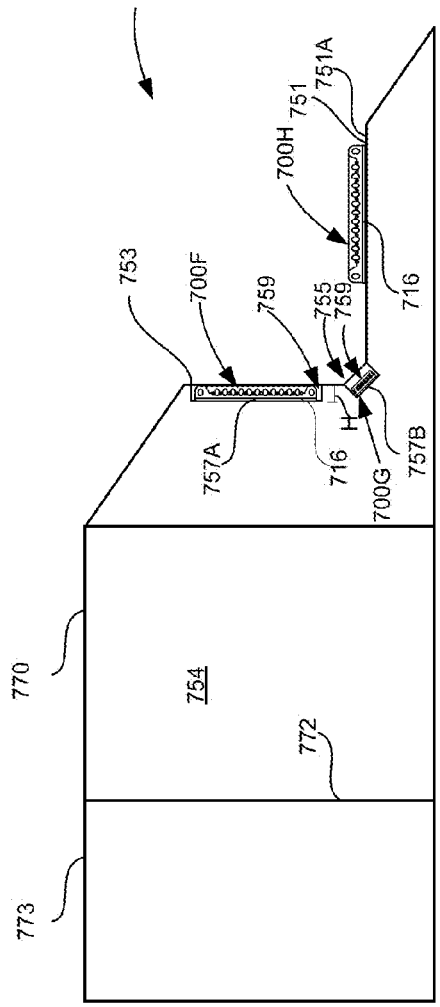

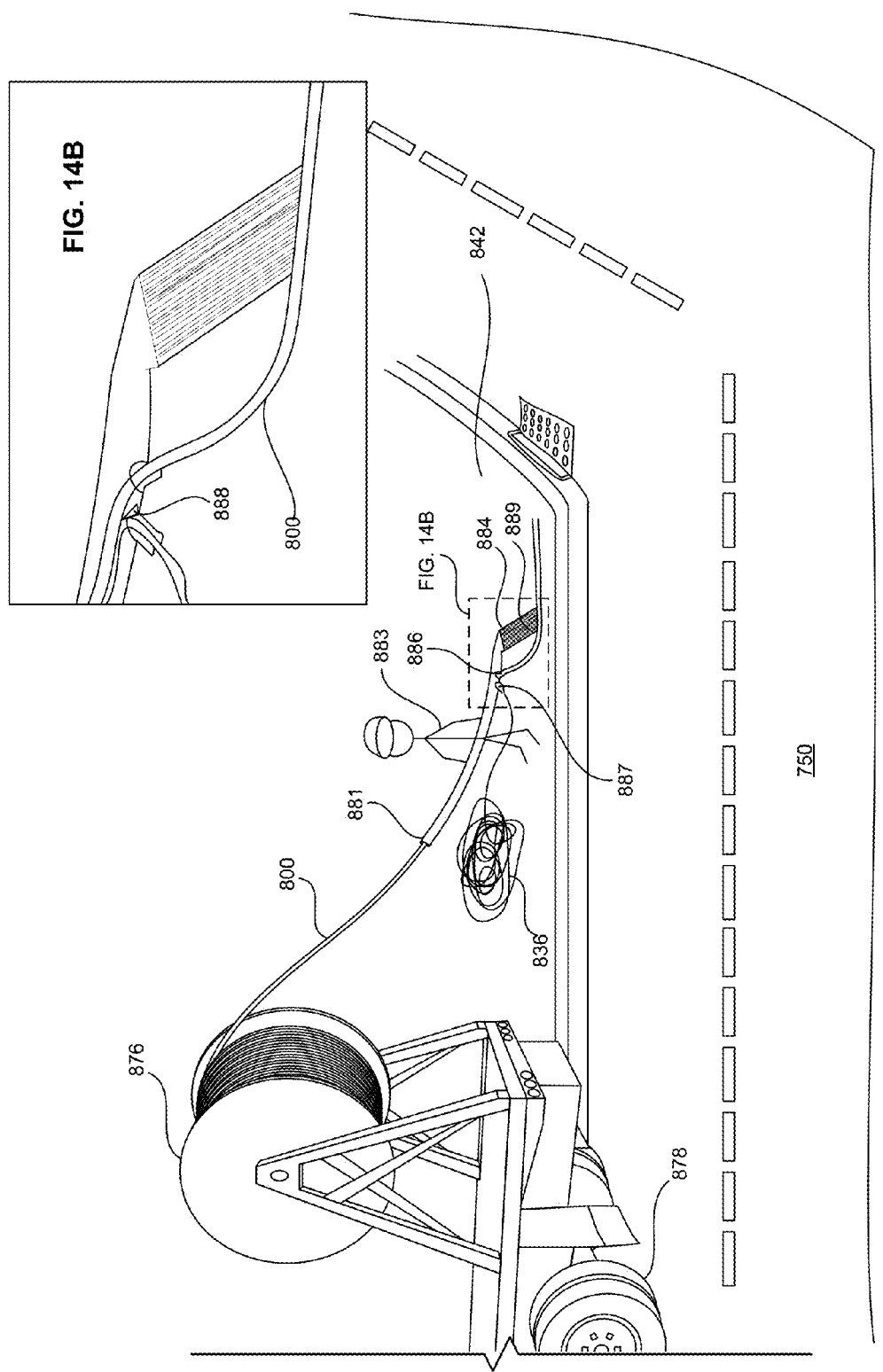

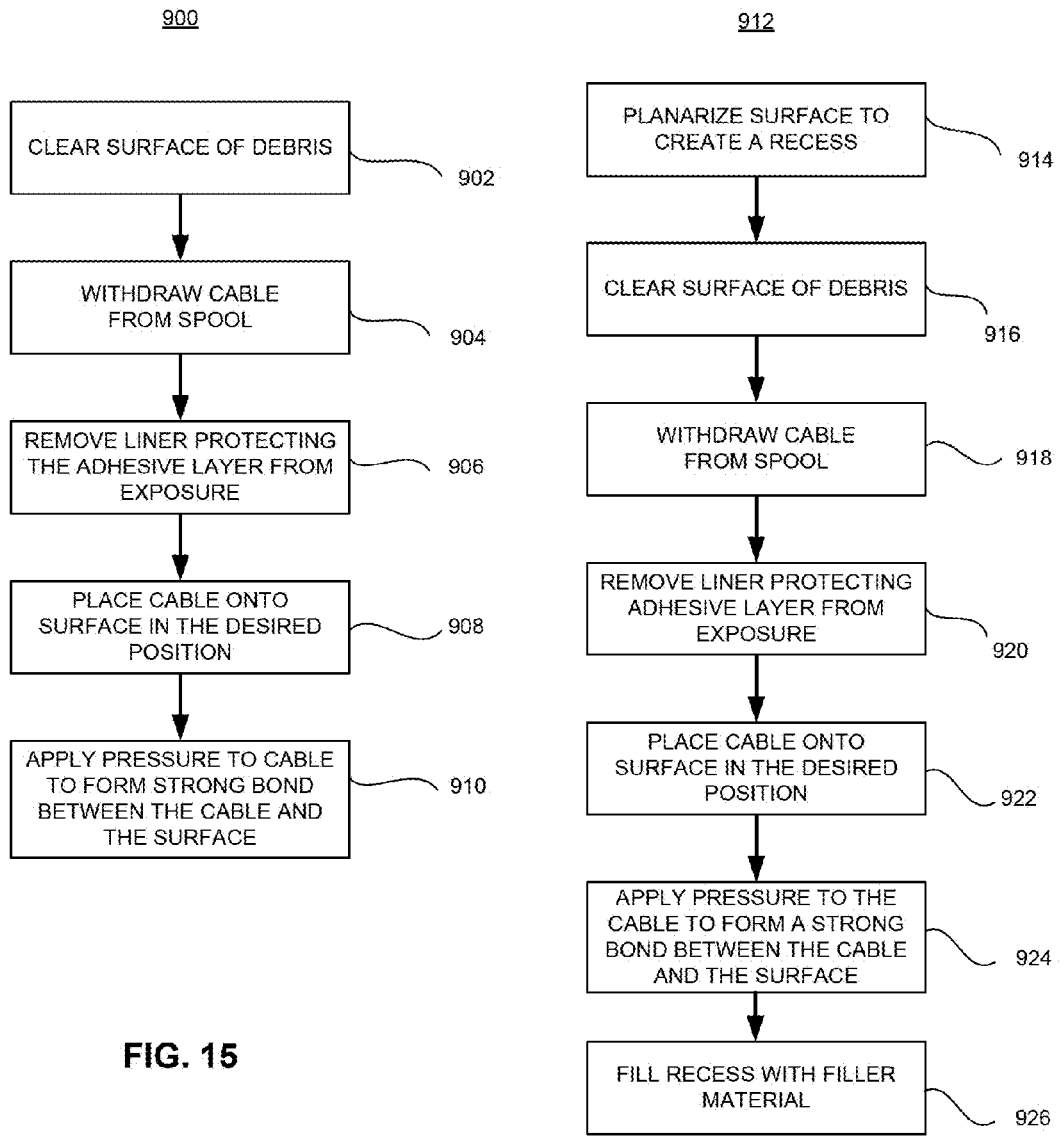

RAPID DEPLOY OUTDOOR CABLE

BACKGROUND OF THE INVENTION

Fiber-to-the-home or Fiber-to-the-premise (FTTH, FTTP, or FTTx) systems are broadband communication solutions that have quickly become a preferred technology for delivering bandwidth-intensive data such as pictures, video and Internet services. The systems are currently in deployment throughout the U.S. and other parts of the world. There are a number of options for deploying fiber, such as running fiber cable aerially from the existing utility poles, or burying cable straight into the ground or in existing or new ducts.

Various methods can be used to deploy fiber cables in an FTTx system. Feeder cables may run to a Multiple Dwelling Unit (MDU) or be buried underground or be placed into ducts. The feeder cable can be split into a group of distribution cables that each ends at a fiber distribution terminal (or access terminal). The distribution fiber cables may be buried underground, into ducts or run aerially between utility poles. Drop cables may also be buried underground or into ducts or run aerially between the utility poles.

There are different drawbacks to the above methods. For example, aerial deployment may be impractical because existing utility poles are full or the owners of the poles may not permit fiber to be strung on the poles, or there is simply no aerial facilities in many suburban areas. New aerial deployments may not be permitted due to zoning or other regulations.

Burying fiber underground may not be feasible in many situations. Typically in urban areas, fiber cable needs to be buried under a roadway anywhere from several inches up to 3 feet under the surface. Heavy equipment is required to cut through the asphalt, concrete or tarmac, and debris must be removed before the fiber cable is deployed in a trench. After the deployment, the trench must be covered and the road surface must be restored. Thus, burying fiber cable using traditional technologies and restoring the road surface often requires considerable effort and time, and may be prohibitively expensive. Furthermore, traditional burying technologies bringing along loud noise, debris and dust, can cause significant community disruption to traffic and residents. Many municipal governments have become increasingly reluctant to allow carriers to excavate streets and require permits to excavate in limited construction windows which can delay deployment of the cables. Traditional burying technologies also cause difficulties in maintaining the fiber network because excavation and restoration are often required to locate and repair a faulty point.

BRIEF SUMMARY OF THE DISCLOSURES

Aspects of the present disclosure provide a low-impact, time-efficient and cost-saving optical fiber deployment technology.

According to one aspect of the disclosed embodiments, a cable comprises an outer housing, a plurality of optical fibers, and a removably attached access layer. The outer housing may have a planar bottom surface extending along a width of the outer housing. The plurality of optical fibers may be positioned within the outer housing and arranged in parallel with one another along the width of the cable. The removably attached access layer may provide access to the plurality of optical fibers and form a first portion of the housing. The access layer may further have a shape complementary to a second portion of the housing from which the access layer can be separated.

In another example of this aspect, the cable may further comprise an adhesive layer disposed at the bottom surface of the outer housing. The adhesive layer may be comprised of a material configured to secure the cable to a surface exposed to an outside environment.

In another example of this aspect, the cable may further include a plurality of strength members. A first and second strength member may be disposed within the outer housing such that the plurality of optical fibers are disposed between the first and second strength members. The distance between the top and bottom surface of the second portion of the outer housing is greater adjacent to the first and second strength members than the portion of the outer housing adjacent to the optical fibers. A strength member may also be disposed between each of the optical fibers. The plurality of strength members can be comprised of resin embedded with glass fibers or synthetic aramid fibers.

In another example of this aspect, the surface is one of a rod, a sidewalk, and a curb.

In still another example of this aspect, the access layer may be configured to move from a first closed position to a second open position where the access layer is moved away from the first portion of the housing, wherein the optical fibers are exposed when the access layer is in the second open position. The cable may further include a plurality of strength members positioned between each of the optical fibers. The strength members may be secured to the access layer such that when the access layer is moved from the first closed position to the second open position, the strength members are moved away from a remainder of the outer housing.

In one example of this aspect, the width of the outer housing of the cable has a cross-section in the shape of a trapezoid.

In still another example of this aspect, the adhesive layer is a first adhesive layer, and the access layer includes a second adhesive layer that allows for the access layer to be moved back and forth between the first closed position and the second open position, wherein the access layer is secured to the housing in the first closed position. In another example, the adhesive layer may be a first adhesive layer and the access layer is secured to the housing by a second adhesive layer.

In another example of this aspect, the plurality of optical fibers include at least twelve fibers.

In another example of this aspect, the cable further comprises microducts and the optical fibers are positioned within microducts.

In accordance with another aspect of the presently disclosed embodiments, a method of deploying a cable onto a surface exposed to an outside environment includes removing a liner overlying the adhesive layer of the cable to expose the adhesive layer; placing the adhesive layer into contact with the surface; and applying pressure to the cable to secure the cable to the surface. The deployed cable may include an outer housing, a plurality of optical fibers, a removably attached access layer, and an adhesive layer. The outer housing may have a planar bottom surface extending along a width of the outer housing. The plurality of optical fibers may be positioned within the outer housing and arranged in parallel with one another along the width of the cable. The removably attached access layer may provide access to the plurality of optical fibers and form a first portion of the housing. The access layer may further have a shape complementary to a second portion of the housing from which the access layer can be separated. The adhesive layer may be disposed at the bottom surface of the outer housing, the adhesive layer comprised of a material configured to secure the cable to a surface exposed to an outside environment.

In another example of this aspect, the cable is a first cable and the method further includes exposing a second adhesive backing layer disposed at a bottom surface of a second cable, the second cable housing a second plurality of second optical fibers; and securing an adhesive layer of the second cable to a top surface of the first cable.

In still another example according to this aspect, exposing a second adhesive layer includes removing a second adhesive backing liner from the bottom surface of the second cable to expose the second adhesive layer.

In yet another example of this aspect, depositing the first cable is deposited at the same time the first adhesive backing liner is removed.

In another example of this aspect, the first cable and the second cable are cut from a same primary cable. Alternatively, the first cable and the second cable are cut from a different primary cable.

In another example according to this aspect, the first cable further comprises reinforcing members provided within the first cable housing, wherein when the access layer is in the open position, portions of the plurality of first optical fibers are exposed, and wherein when the flap is closed, the plurality of first optical fibers are concealed within the first cable housing.

In yet another example of this aspect, the cable is a first cable and the method further includes exposing a second adhesive backing layer disposed at a bottom surface of a second cable; positioning the second cable in a direction extending away from the first cable; and blowing one of the plurality of optical fibers in the first cable through the microduct. In this example, the second cable houses a microduct. Prior to blowing, the access layer of the first cable may be in the open position so as to provide access to the one of the plurality of optical fibers within the outer housing.

BRIEF DESCRIPTION OF THE DRAWINGS

FIGS. 3-4 are examples of a portion of the example cable of FIG. 1 pulled upward according to aspects of the disclosure;

FIG. 5 is a cross-sectional view of another example cable according to aspects of the disclosure;

FIGS. 6A-6B are examples of a portion of the example cable of FIG. 5 pulled upward according to aspects of the disclosure;

FIG. 7 is a cross-sectional view of another example cable according to aspects of the disclosure;

FIG. 8 is a cross-sectional view of the example cable of FIG. 7 showing the presence of a fiber optical strand therein according to aspects of the disclosure;

FIG. 9 is a cross-sectional view of an example cable according to another aspect of the disclosure;

FIG. 10 is a cross-sectional view of another example stacked arrangement of example cables according to aspects of the disclosure;

FIG. 12 is a schematic view illustrating various examples of surfaces onto which example cables may be positioned according to aspects of the disclosure;

FIGS. 13A-13F are enlarged views of FIG. 12;

FIG. 14A is a schematic view of a device for deploying cable onto a surface;

FIG. 14B is an enlarged portion of FIG. 14A;

FIG. 15 is flow chart illustrating a method of deploying cable according to an aspect of the disclosure;

FIG. 16A is flow chart illustrating a method of deploying cable according to another aspect of the disclosure;

DETAILED DESCRIPTION

According to aspects of the present disclosure, an optical fiber cable with an industrial adhesive backing, as well as methods for rapidly deploying the optical fiber cable are disclosed. The adhesive backing on the optical fiber cable allows for rapid deploy of the cable directly onto a road surface, curb, sidewalk or any surface exposed to the outdoor environment. Deploying such cable directly onto these surfaces can eliminate the need for costly underground construction typically required to deploy such cables, such as plowing, trenching and boring, all of which require heavy machinery and a significant labor force. Further, the arrangement of strength members within the cable can provide further structural support for the fiber cable and provide resistance to external forces both during and after deployment of the cable. Cables can further include an access layer that provides access to the fibers within the cable and further aids in the deployment process and forming lateral connections. The example cables disclosed herein allow for the cables to be deployed by a small crew of two to three people at a dramatically increased productivity, which significantly reduces the overall time and cost required to deploy the cable.

Figure 1:
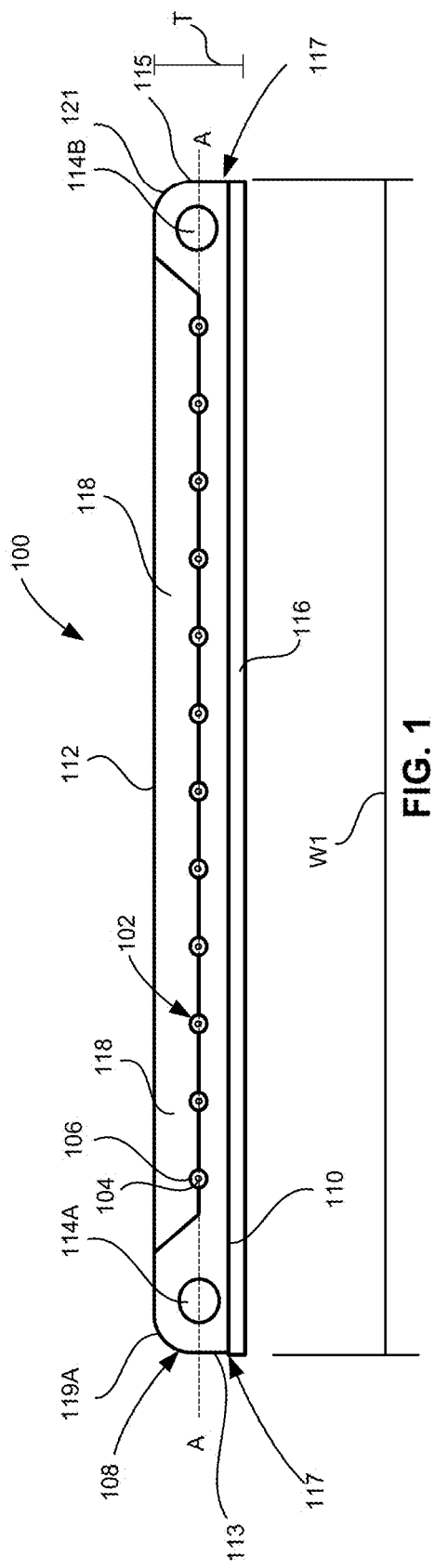
FIG. 1 is a cross-sectional view of an example cable according to an aspect of the disclosure.

Turning to the figures wherein similar reference numbers are used to indicate similar features, FIG. 1 illustrates an example optical fiber cable 100. Optical fiber cable 100 may include a plurality of optical fiber units 102 positioned within the cable. In this example, each unit 102 includes at least one optical fiber strand 104, which is capable of transmitting and receiving data. Unit 102 may further include an outer jacket 106 that encompasses each optical fiber strand 104. Jacket 106 may be comprised of polyvinyl chloride (PVC) or fluoride co-polymer. Other components intended to protect each of the fibers 104 may further encompass each of the fibers 104, such as a thermoplastic overcoating or buffer or a dielectric strength member. Units 102 may be spaced apart from one another and positioned side-by-side along a width W1 of cable 100. Each unit 102 may further include lengths that extend along a length L (FIG. 3) of cable 100.

In other examples, more than one optical fiber strand 104 may be provided within jacket 106, such as two or more strands 104 within each jacket 106. For example, there may be between two fiber strands to twelve fiber strands within each jacket 106. Accordingly, in this example, the overall number of optical fibers within cable 100 may range from twelve optical fiber strands (one optical fiber strand 104 in each unit 102) to one-hundred forty-four optical fiber strands (twelve optical fiber strands 104 in each unit 102). Moreover, the number of strands in one jacket may vary from the number of strands present in another jacket of cable 100. Any number of optical fiber strands 104 within each unit 102, and any overall number of units 102 within each cable 100 may be used.

Cable 100 may further include strength members provided within cable housing 108. For example, a first strength member 114A and a second strength member 114B are shown positioned adjacent fiber units 102, as well as at the outermost ends of cable 100 and fiber optic units 102. In other examples, strength members may be provided in any arrangement within cable 100. Strength members can be used to strengthen the fiber optic cable 100 and to absorb stress to mitigate shearing of the fiber strands 102 within cable 100. In one example, strength members 114A, 114B may be flexible and in the shape of elongated rods. Strength members 114A, 114B may be comprised of any number of materials having a high tensile strength capable of withstanding the weight of a moving vehicle. For example, the strength members may be comprised of resin embedded with glass fibers or synthetic aramid fibers. The circumference of the strength members may also be larger than the optical fibers and any components surrounding the optical fibers, so as to minimize amount of force that can be exerted onto the cable and to prevent exterior forces from crushing the optical fibers. In some examples, strength members may have a circumference that is at least two to three times the size of the circumference of the optical fiber units 102. Despite the difference in size between the circumferences of the strength members and the optical fibers or optical fiber units, in this example, cable housing 108 can maintain a constant overall thickness T (FIG. 1) along the overall length L (FIG. 3) of the cable. This can mean that the actual thickness of the material comprising the cable housing 108 varies, such that the thickness of the material adjacent the fiber units 102 will be greater than the thickness of the material adjacent the strength members. In other examples, the thickness of the material adjacent the strength members may be greater than the thickness of the housing material adjacent the optical fibers. In still other examples, cable housing 108 may have an overall thickness T that varies at one or more points along the length of the cable.

Strength members may be arranged in different configurations within the housing to provide optimal strength to the cable and protection for the optical fibers. For example, as shown, the strength members may be positioned at the outermost ends of the cable and optical fibers. Such a configuration may be utilized where it is unlikely for the cable to be exposed to exterior forces, such as the interior portion of a sidewalk. In another example, where the cable is likely to be exposed to exterior forces, the strength members may be positioned between each of the optical fibers. In still other examples, the strength members may be provided at both the outermost ends of the cable and between each of the optical fibers. The strength members can be positioned relative to the optical fibers in any number of arrangements intended to provide resistance to exterior forces.

Although not required, the fiber and strength members will be positioned such that the central axes of the strength members and central axes of optical fibers 104 are aligned along an axis A. In other embodiments, the fiber and strength members may be staggered.

Fiber optic cable 100 further includes a sheathing or housing 108 that houses fiber optical units 102 and strength members 114A, 114B. For example, housing 108 includes a bottom surface 110 and a top surface 112. The bottom surface 110 may be planar, extending substantially linearly across the width of the bottom surface relative to the width of the cable. In this example, bottom surface 110 is planar and extends linearly along the entire width W1 of cable 100. Top surface 112 is also planar and extends linearly along width W1 of cable 100 and extends along a plane that is parallel to bottom surface 110. Edge surfaces 113, 115 may extend upwardly from bottom surface 110. For example, as shown, edge surfaces 113, 115 extend upwardly in a direction perpendicular to bottom surface 110. Corners 117 are formed at the point where edge surfaces 113, 115 intersect with bottom surface 110. In this example, corners 117 form right angles. Opposed corners 119A, 121 are formed at the intersection between top surface 112 and edge surfaces 113, 115. Opposed corners 119A, 121 are rounded, but in other examples, corners 119A, 121 may form a right angle or any other angle.

In other examples, it may be desired for bottom surface 110, as well as or alternatively, top surface 112 to include grooves or indentations to accommodate deployment of cable 100 onto a surface that is not planar or linear. Similarly, edge surfaces 113, 115 may not extend in a direction perpendicular to bottom surface 110, and may extend away from bottom surface 110 at an acute angle or an obtuse angle. Housing 108 may be comprised of a flexible polymer plastic, such as high-density polyethylene (HDPR) or polyethylene high density (PEHD), although any material can be utilized.

An adhesive layer may be disposed on the cable housing and formed as part of the cable. The adhesive layer can secure the cable to a surface exposed to the outer environment. For example, as shown in FIG. 1, an adhesive layer 116 may be disposed at bottom surface 110 of cable housing 108. Adhesive layer 116 may include an adhesive that is an industrial strength pressure-sensitive adhesive. The selected adhesive can possess certain properties suitable for bonding cable housing 108 to a surface exposed to the outer environment. For example, the selected adhesive may be capable of securely and permanently bonding the cable with a road surface, curb, sidewalk or the like, while withstanding exposure to extreme temperatures and elements of the outdoor environment. The selected adhesive must also be of a sufficient strength to remain bonded with both the outdoor surface and the cable and to withstand exterior force. Representative examples of industrial adhesives suitable for the adhesive layer can include acrylics, epoxy, silicone, and combinations thereof, although any adhesive capable of securely bonding with a road surface or the like and withstanding extreme temperatures and outdoor elements may be utilized.

In one example, adhesive layer 116 may be a coating on bottom surface 110 of cable 100. Adhesive layer 116 may be spray coated or painted onto cable housing 108. The adhesive layer may also be separately formed and laminated onto the cable housing. Other techniques for depositing adhesive layer 116 onto bottom surface 110 of the cable housing 108 may also be utilized.

The thickness of adhesive layer 116 can range from about 25 micrometers to about 1,000 micrometers depending on where the cable will be deployed. In this range of thickness, the thicker adhesive layers may enable separation between the cable and adhesive layer more easily that a thinner adhesive layer.

Adhesive layer 116 may be protected by a removable liner backing when cable 100 is stored and not in use. The removable liner backing may be comprised of a material that will attach to the adhesive layer, but does not cause the adhesive layer to permanently attach to the liner backing. The removable liner backing can prevent adhesive layer 116 from being activated when not in use. Thus, prior to deployment of the cable, lengths of the cable sufficient to span significant distances may be stored. In one example, cable 100 may be stored on an industrial spool (FIG. 14A).

In other examples, an adhesive layer is not formed as part of cable 100 and an adhesive may be applied to cable 100 in a separate step. For example, an adhesive material may be deposited onto a surface and the cable 100 then applied to the top of the adhesive material. Similarly, at least a portion of cable may be embedded within an adhesive material and then secured to an outer surface when the adhesive material has cured.

Housing 108 of cable 100 may further include an access layer. In one example, access layer 118 may be a layer of housing 108 that is spaced away from bottom surface 110 and includes a portion of top surface 112 of housing 108. Access layer 118 can be used to provide access to fiber optic units 102 within cable 100. In this example, access layer 118 may extend across the entire length L (FIG. 4) of cable 100, as well as over optical fiber units 102 in a direction across width W1 of cable 100.

Figure 2:
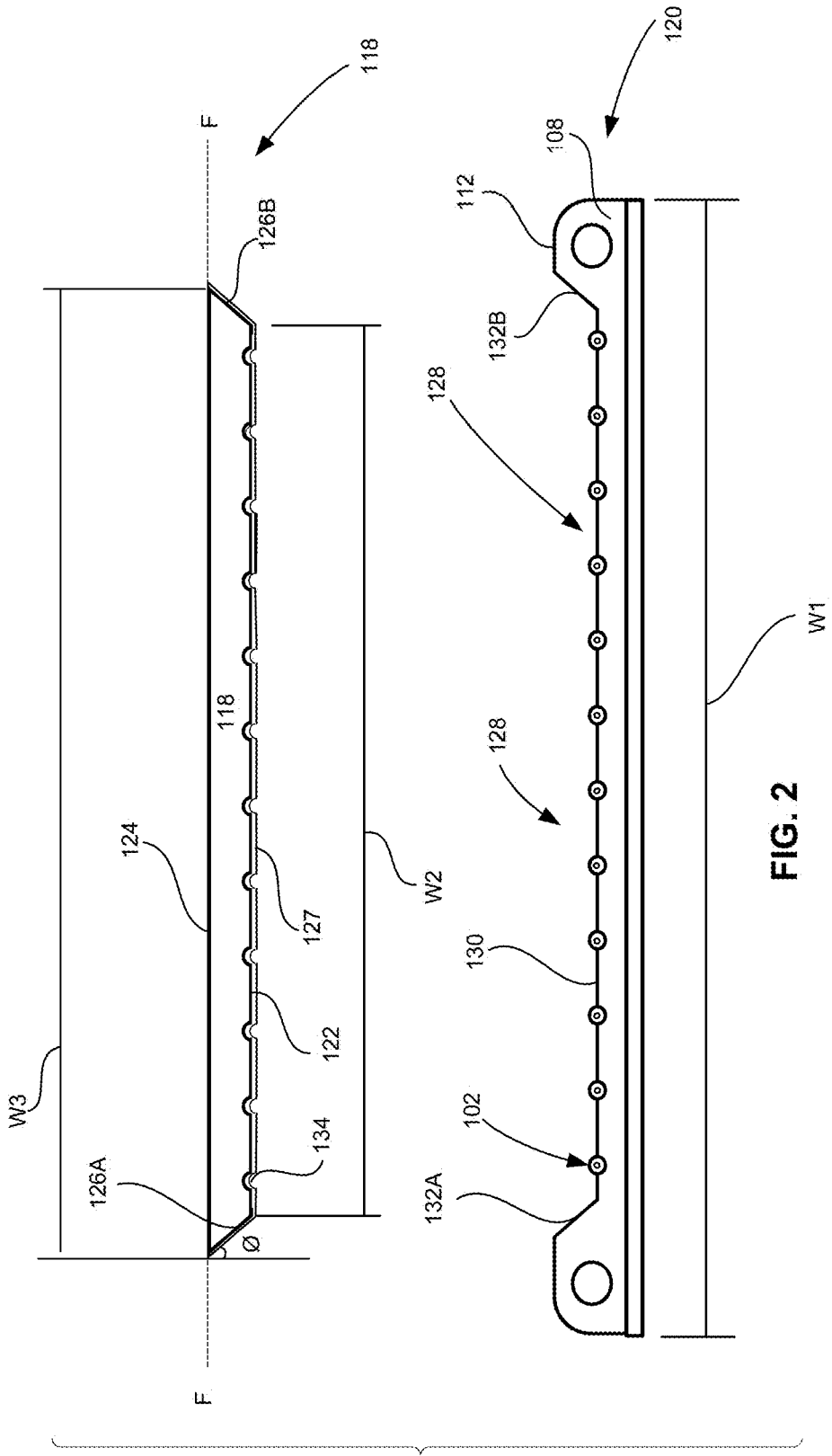
FIG. 2 is an exploded cross-sectional view of the example cable of FIG. 1.

With reference to FIG. 2, which is an exploded view showing access layer 118 completely removed from main body 120 of housing 108, access layer 118 may be a pre-cut layer that allows access layer 118 to be separated away from main body 120 of housing 108. For example, access layer 118 may be precut into the general shape of an inverted trapezoid. This profile shape extends across cable 100 in a direction of the width W1 of housing 108. First surface 122 of access layer 118 forms a base of the inverted trapezoid shape and is positioned within the interior of housing 108. Second surface 124 of access layer 108 is a surface that is opposed to first surface 122 and has a width W3 that is greater than a width W2 of first surface 122. Second surface 124 includes top surface 112 of housing 108. Edge surfaces 126A, 126B of access layer 118 extend between first and second surfaces 122, 124 of access layer 118. In this example, edges surfaces are positioned at an angle relative to the first and second surfaces 122,124. For example, edge surfaces 126A, 126B extend abruptly away from first surface 122 and form side surfaces of the inverted trapezoid shape. Second surface 124 is oriented along a longitudinal axis F and may be substantially parallel to first surface 122. At least one of the sidewalls 126A, 126B may be oriented at an angle θ, such as an acute angle, relative to a vertical axis that is perpendicular to second surface 124. As discussed below in detail, angled sidewalls 126A, 126B can allow access layer 118 to be easily pulled away from the remainder of housing 108.

Access layer 118 of cable 100 may be pre-cut into any other desired shapes that will provide a user with access to the optical fiber units 102 within cable 100. For example, access layer 118 may be cut into a rectangular shape or an oval shape. Additionally, instead of access layer 118 being a continuous layer extending the entire length L (FIG. 4) of cable 100, which is perpendicular to width W1 of cable 100, access layer 118 may be provided only along certain portions of length L.

The shape of access layer 118 may be complementary to the shape of interior surface of housing 108 and any components within housing 108. For example, with reference still to FIG. 2, main body 120 of housing 108 includes an interior portion 128 that is in the complementary shape of an inverted trapezoid. In this example, the exposed interior portion 128 exposes fiber optic units 102, as well as interior surface 130 of main body 120. Interior surface 130 extends between each of fiber optic units 102. Interior surface 130 also includes edge surfaces 132A, 132B extending upward and toward top surface 112 of housing 108. Thus, edge surfaces 126A, 126B of access layer 118 complement edge surfaces 132A, 132B of main body 120. Recesses 134 in access layer 118 are sized and shaped to receive fiber optic units 102. Similarly, first surfaces 122 extending between each of recesses 134 will complement interior surfaces 130 of main body 120.

Access layer 118 may be removably attached to interior surface 130 of main body 120 by an adhesive layer deposited between interior surface 130 and first surface 122 of access layer 118. For example, an adhesive layer 127 may be provided on surface 122 of access layer 118 to allow access layer 118 to be attached and reattached to main body 120 of housing 102. Adhesive layer 127 may be disposed at first surface 122 of access layer 108. Adhesive layer 127 may extend across the entire width W1 and length L of cable 100. Alternatively, adhesive layer 127 may be provided only on certain portions of cable 100 and not continuously along entire length of adhesive layer. In other embodiments, adhesive layer 127 may instead be manufactured along interior surface 130 of main body 120 of housing 108. In other examples, an adhesive may be provided only after removal of access layer 118 directly onto first surface 122 of access layer 118 or surface 130 of main body 120 or both.

Adhesive layer 127 can include an adhesive material possessing sufficient strength to secure access layer 128 to the remainder of housing 108, but capable of permitting access layer 118 to be removed away from housing 108 and to also permit access layer 118 to be rejoined and re-secured to housing 108.

Other methods or devices can provide access layer 108 with the ability to be attached and reattached to main body 120 of housing 118 of cable 100. For example, a re-peelable double sided tape may be used during preparation of access layer 118 and positioned between access layer 118 and main body of housing 108. Such tape could also be implemented after the access layer has been pulled away. An adhesive can also be applied after removal of access layer 118 and prior to placing access layer 118 back into place. In other examples, access layer may be designed to have a frictional fit within main body 120 of housing 108. In such example, the dimensions of access layer 118 may be slightly larger than the interior portion 128 of main body 120 that receives access layer 118. Friction will then be used to secure access layer 118 to cable 100.

Access layer 118 can be pulled away from a main body 120 of housing 108 along width W1 of the cable or along the length L of the cable. When it is desired to peel access layer 118 away from main body 120, a technician may make a shallow cut into access layer 118 across width W1 so as to provide an access point or opening. The technician may then begin to pull access layer 118 upward away from main body 120 at the access point. The technician may then pull access layer 118 upward along width W1 of housing or along length L of housing.

FIG. 3 illustrates access layer 118 being separated from main body 120 along the width of cable 100. For example, access layer 118 may be pulled upward in a direction D1 along width W1 of cable 100. Pre-cut angled edges 126A, 126B of access layer 118 and angled edges 132A, 132B of main body 120 allow for a tool or the like to be inserted between main body 120 and access layer 118. Since access layer 118 is precut, this facilities the process of peeling access layer upward and away from main body 120 in a direction from left to right. Alternatively, access layer 118 may be separated from right to left. As access layer 118 is pulled upward, fiber optic units 102 are exposed, as well as interior surface 130 of main body 120. It is to be appreciated that any length of access layer 118 may be pulled upward, but to provide the technician with access to fiber units 102 by only pulling up only a portion of access layer 118 is sufficient.

FIG. 4 illustrates an example of access layer 118 being separated from main body 120 along length L of cable 100, instead of width W1. In this example, access layer 118A may be pulled up and away from the remainder of the housing in a direction D2 along length L of the cable. Separating access layer 118 away from main body 120 exposes fiber optic units 102 within interior portion 128 of main body 120.

After access layer 118 has been pulled up and away from main body 120, access layer 118 can thereafter be put back in place within cable housing 108. For example, adhesive layer 127 (FIG. 2) can help to secure access layer 118 and main body 120 together.

Cable 100 can be manufactured in various ways. For example, access layer 118 and main body 120 can be separately manufactured and later joined together. Access layer may be manufactured so as to have a pre-determined shape and include recesses 134 shaped and sized to receive fiber optic units 102. Main body 120 may be manufactured to have an interior portion 128 that has a shape complementary to the shape of access layer 118 and vice versa. Fiber optic units 102 can be extruded at the same time cable 100 is extruded so that fiber optic units are embedded within main body 120.

With reference to FIG. 5, another example cable 200 according to aspects of the disclosed embodiments is shown. This example is similar to the example cable 100 of FIG. 1-4, but incorporates additional strength members into the cable housing. For example, cable 200 includes fiber optic units 202, each of which include at least one fiber strand 204 and jacket 206. First and second strength members 214A, 214B are arranged at outermost ends of cable 100. Intermediate strength members 215 are also provided between each fiber optic unit 202. For example, eleven strength members 215 are provided between each of the twelve units 202. A pre-cut access layer 218 is also provided, which is in the overall shape of an inverted trapezoid.

As in the prior embodiment, access layer 218 may be separated away from main body 220. With reference to FIG. 6A, access layer 218 is shown being separated from main body 220 of housing 208 in a direction D3 along width W4 of cable 200. In this example, each intermediate strength member 215 is pulled away with access layer 218. Interior portion 228 of main body 220 is exposed as access layer 218 is pulled away. Interior portion 228 includes fiber optic units 202 and interior surface 230. Interior surface 230 is shaped to complement the access layer 218 and intermediate strength members 215. Edge surfaces 232A, 232B of main body 220 complement edge surfaces 226A, 226B of access layer 218. When strength members 215 are pulled away from main body 220, this provides for easy access to fiber optic units 202, without being hindered by the presence of adjacent strength members 215. In other examples, it may be desired for intermediate strength members to remain within main body 220, such that they will not pull away with access layer 218 when access layer 218 is pulled away. In such example, strength members will remain within cable housing and provide protection for adjacent fiber optic units 202.

Turning to FIG. 6B, another example of access layer 218 being pulled away from main body 220 is shown. In this example, access layer 218 is pulled up and away from main body 220 along length L of cable 200. Intermediate strength members 215 are attached to access layer 218 and pull up and away from main body 220 at the same time access layer 218 is pulled up and away.

Various methods may be utilized to ensure that intermediate strength members 215 pull away with access layer 218. For example, the access layer can be separately extruded from main body 220. Access layer 218 may be extruded over strength members 215 to form a monolithic body. In another example, access layer 218 may be prepared with recesses for receiving strength members 215. Strength members 215 can be attached to access layer 218 by an adhesive or the like. In still another example, recesses within access layer 218 may be machined to provide for a friction fit between strength members 215 and the recesses.

FIG. 7 illustrates an example cable 300 according to another aspect of the disclosed embodiments. Cable 300 is similar to the previous embodiments and includes a cable housing 308, first and second strength members 314A,314B positioned at outermost ends of cable housing 308, an access layer 318, and an adhesive layer 316. Unlike the prior embodiments, cable 300 further includes microducts 301. Each of the intermediate strength members 315 are provided between each of the microducts 301 to provide further resistance to exterior forces applied to cable 300.

Microducts 301 can provide pathways for subsequent placement of optical cables that have relatively low pulling tension limits. For example, microducts 301 may be flexible or semi-flexible ducts having small diameters. The pathways provided by microducts 301 allow for subsequent deployment of fiber optic units, such as optical units 102, 202 previously discussed herein. For example, the fiber optic units may be deployed by mechanically pulling the fiber optic units through the microducts 301 or blowing the fiber optic units through microducts 301 using a high air volume blowing apparatus.

The microducts may be formed with any suitable material such as polymeric material and may be constructed in a way to provide robust protection for enclosed fiber cables. For example, the inner surface of the tubing may be disposed with ridges or constructed in other ways to reduce the frictions among the fiber cables routed within. In one example, microducts 301 may be lubricated to reduce any resistance or friction that will impede the progress of fiber optic units as they are blown or pulled through microducts 301. The outer surface of microducts 301 may also be constructed in a way to withstand the environmental impacts, such as compression, tearing, heat and dampness, etc.

With reference to FIG. 8, example cable 300A is shown with fiber optical units 302 that have been deployed within microducts 301. Fiber optical units 302 are similar to units 102, 202 previously discussed herein and can include at least jacket 306 and at least one fiber optic strand 304. Access layer 318 may be pulled away from main body 320, as described in previous embodiments. Intermediate strength members 315 will also pull away with access layer to expose the interior portion of main body 320 and microducts 301.

It is to be appreciated that intermediate strength members 315 can be arranged within cable housing 308 in numerous other arrangements. For example, an intermediate strength member 315 may be positioned between every two microducts 301 or in the exact middle between microducts. Various configurations are contemplated by the scope of this disclosure.

FIG. 9 illustrates an example cable 400 according to another aspect of the disclosure. In this example, cable 400 houses a single microduct 401. Strength members may be arranged adjacent microduct 401 to withstand exterior forces. For example, two strength members 415A, 415B may be provided on one side of microduct 401 and two strength members 415C, 415D may be provided on the other side of microduct 401. Any desired arrangement of strength members can be provided within cable 400. As will be discussed in greater detail herein, in one example, cable 400 can be used when it is desired to form a lateral connection away from a primary cable line carrying a plurality of fiber optical units, such as example cables 100, 200 and 300.

FIG. 10 provides an example stacked cable arrangement 490 according to an aspect of the present disclosure. As shown, several cables 500, 500A, 500B, 500C may be stacked one-on-top of the other to increase the capacity of optical fibers along a given length of cable. In this example, cable 500 is similar to cable 100 described with regard to FIGS. 2-4 and is deployed on a surface 560. Surface 560 can be any surface, including but not limited to a roadway, sidewalk, and driveway surface. Adhesive layer 516 of cable 500 secures cable 500 to surface 560. A second cable 500A is stacked on top of cable 500. Adhesive layer 516A secures second cable 500A to top surface 512 of cable 500. As shown, adhesive layer 516A extends across substantially the entire length of top surface 512 of cable 500. A third cable 500B is stacked on top of cable 500A. Adhesive layer 516B secures third cable 500B to top surface 512A of cable 500A. As shown, adhesive layer 516B also extends across substantially the entire length of top surface 512A of cable 500A. Finally, a fourth cable 500C is shown stacked on top surface 512B of cable 500B and secured to cable 500B by adhesive layer 516C.

In this example stacked arrangement 490, each of the cables 500, 500A, 500B, 500C has at least one respective outer edge 513, 513A, 513B, 513C that is aligned with the outer edges one another along an axis A1. Second outer edges 515, 515A, 515B, 515C may also be aligned with one another along an axis A2. Furthermore, it is to be appreciated that in this example, cables 500, 500A, 500B, 500C include rounded corners 519A-519C and 521A-521C. However, one or more of respective corners 519A, 519B, 519C, 519D of cables 500, 500A, 500B, 500C may instead be formed at right angles to increase the surface area in which top surface 112 is in contact with adhesive layer 516A.

In other examples, any number of cables may be stacked one on top of the other, such as two to five or more cables. It is to be appreciated that the first and second cables may be cut from the same length of a primary cable, or after the first cable is deployed, the second cable may be cut from a separate primary cable. It is to be further appreciated that although the stacked arrangement 490 is shown positioned on an outermost top surface of an outdoor surface, stacked arrangement 490 may instead be provided partially or completely within a recess, such that at least a portion of the stacked arrangement is positioned below the top surface of the outdoor surface.

It is to be appreciated that any cable configured in accordance with the disclosure herein can be stacked one on top of the other. For example, a stacked cable arrangement may include two or more cables that have the same configuration as cable 200. Similarly, another stacked cable arrangement may include two or more cables that have the same configuration as cable 300.

Figure 11:
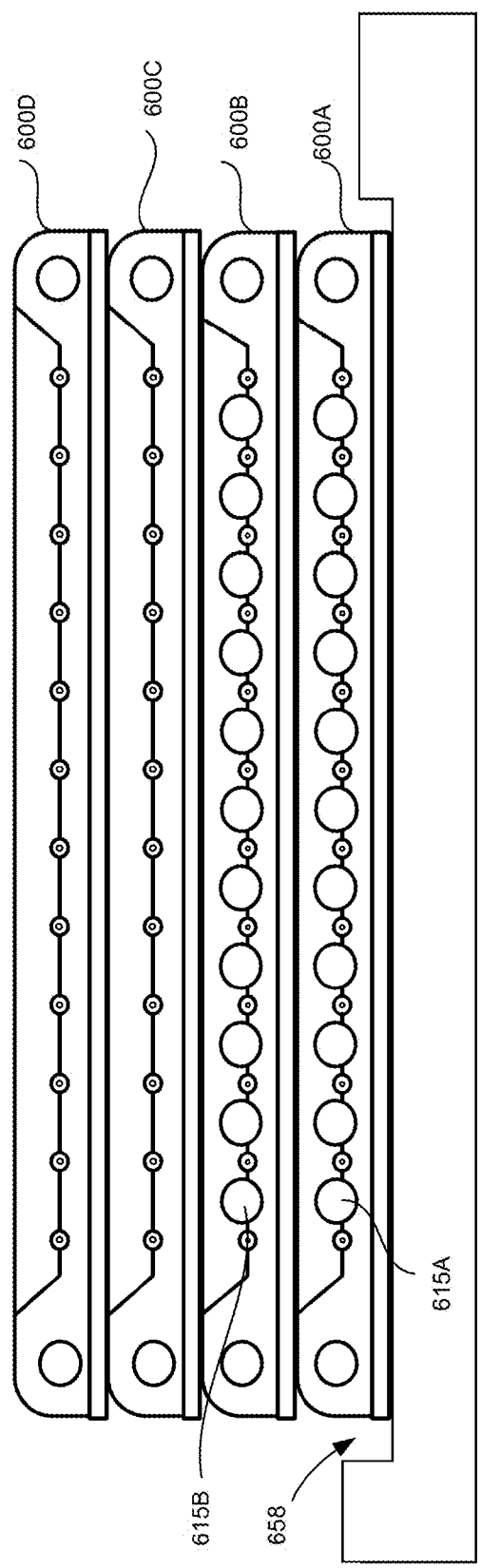
FIG. 11 is a cross-sectional view of another example stacked arrangement of example cables according to aspects of the disclosure.

Cables having different configurations may also be stacked one on top of the other. For example, as shown in FIG. 11, cables 600A, 600B, 600C, and 600D are stacked one on top of the other. Cables 600A, 600B are similar to cable 200 of FIGS. 5-6B, as previously discussed herein, and cables 600C, 600D are similar to cable 100 of FIGS. 2-4, as previously discussed herein. In this example, cables 600A, 600B include respective intermediate strength members 615A, 615B that can help to support the weight of subsequent cables 600C, 600D. This stacked configuration is also shown partially positioned within a recess.

The cables may be further stacked in different arrangements. For example, two cables may be arranged side by side and a third cable may be secured to the top surfaces of the two cables, such that the cable arrangement is staggered.

In accordance with aspects of the disclosure, a cable according to the embodiments disclosed herein may be deployed onto various outdoor surfaces. For example, with reference to FIG. 12, these surfaces can include, but are not limited to, a road surface 750, a curb 752, and a sidewalk 754. Cables in accordance with the disclosures herein may be deployed directly onto these and other surfaces. For ease of discussion with regard to FIG. 12, reference will be made to deploying a fiber optic cable 700 that is similar to cable 200 onto various surfaces, but any cables constructed in accordance with the disclosure herein may be utilized. As shown, cable 700 includes an adhesive layer 716 that can secure cable 700 onto a road surface 750 (examples 690, 692, 694), a sidewalk surface (examples 696, 698), or a curb surface (example 699). Each of these examples will be discussed in more detail below. It is to be appreciated that these illustrated examples are not drawn to scale and the size of cable 700 relative to the respective outdoor surfaces has been exaggerated for purposes of ease of discussion.

Cable 700A may be deployed onto a road surface. For example, with reference to example 690, as shown in FIG. 12 and FIG. 13A, cable 700A is secured to top surface 760 of road surface 750. In this example, adhesive layer 716 of cable 700A contacts road surface 750 and secures cable 700A to road surface 750. Cable 700A in its entirety is shown overlying top surface 760 of road surface 750.

In other examples, all or a portion of a cable may be secured within a recess of road surface 750. Example 692, as shown in FIG. 12 and FIG. 13B, illustrates cable 700B positioned fully within a recess of a road surface. In this example, recess 758 is sized to receive a height H of cable 700B so that cable 700B is positioned entirely below top surface 756 of road surface. Adhesive layer 716 contacts intermediate road surface 760 and secures cable 700B to road surface 760. Fill material 762, such as rocks, dirt, or any other filler may be used to fill in the remaining space within recess 758 and a sealer 765 may also be provided to ensure a smooth top surface.

Example 694, as shown in FIG. 12 and FIG. 13C, illustrates cable 700C partially positioned within a recess of road surface 750. In this example, cable 700C is partially positioned within a recess 758A. Recess 758A is sized to receive only a portion of cable 700C or less than the total height H of cable 700C. When cable 700C is positioned within recess 758A, top surface 712 of cable 700C extends beyond top surface 756 of road surface 750. Adhesive layer 716 contacts intermediate surface 760A and secures cable 700C to intermediate surface 760A of road surface 750.

Cables disclosed according to aspects of the disclosure may be secured to a surface of a sidewalk. Example 696, as shown in FIG. 12 and FIG. 13D, illustrates cable 700D positioned within a recess of sidewalk 754. This example is otherwise similar to example 690, except that cable 700D is positioned on an intermediate surface 766 within sidewalk 754. Recess 768 of sidewalk 754 is sized to receive the entire height H of cable 700D. In this example, cable 700D is fully positioned within recess 768, such that top surface 712 of cable 700D is positioned below top surface 770 of sidewalk 754.

In other examples, cable 700D may be positioned in any number of configurations relative to sidewalk 754. For example, cable 700D can be positioned directly on top surface 770 of sidewalk 754 or may be partially positioned with a recess, such that a portion of cable 700D is positioned below top surface 770 of sidewalk 754 and another portion of cable 700D is positioned above top surface 770.

Example 698, as shown in FIG. 12 and FIG. 13E, illustrates another configuration where cable 700E is attached to edge 766 of sidewalk. Edge 776 of sidewalk 754 extends between top surface 770 and bottom surface 771 of sidewalk 754. Cable 700E is shown positioned between edge 766 and the ground or soil 774 adjacent sidewalk 754. Ground 774 can be excavated to remove layers of dirt and soil to expose edge surface 766 of sidewalk 754. Adhesive layer 716 of cable 700E can be placed into contact with edge surface 766 of sidewalk 754 to secure cable 700E to edge surface 766. The excavated ground 774 may then be put back into place to protect cable 700E and to ensure that the top surface 770 of sidewalk is substantially planar with the top surface 773 of ground 774.

Cables according to aspects disclosed may also be further secured to a curb surface. Example 699, as shown in FIG. 12 and FIG. 13F, illustrates several examples of an example cable positioned relative to curb 752. Curb 752 includes a horizontal surface 751 parallel to ground surface 773 or top surface 770 of sidewalk 754, a vertical surface 753 that extends in a direction perpendicular to horizontal surface 751, and a corner 755 formed at the intersection between the horizontal and perpendicular surfaces 751,753. In the example shown, adhesive layer 716 of cable 700F contacts an intermediate surface 757A formed by a recess 759. Recess 759 is sized to receive and accommodates the entire height H of cable 700. Similarly, corner 755 of curb 752 can include a recess 759 having an interior surface 757B. Adhesive layer 716 of cable 700G contacts interior surface 757B and secures cable 700G to interior surface 757B. Finally, cable 700H is directly attached to top surface 751A of horizontal surface 751. Adhesive layer 716 is secure to top surface 751A. In other examples, the cable can be placed directly onto any one of the perpendicular, horizontal, or corner surfaces, as well as be positioned partially or fully within a recess in any one of the perpendicular, horizontal or corner surfaces.

Placement of a cable according to aspects disclosed herein are not limited to the examples illustrated in FIG. 12. Cables can be configured on outdoor surfaces in any number of configurations. Moreover, there are numerous other outdoor surfaces that can accommodate a cable according to aspects of the present disclosure.

Referring to FIG. 14A, to deploy and secure a cable, such as the cable disclosed according to aspects of the disclosure, various methods may be utilized. In the example of deploying a cable directly onto a road surface, prior to deploying cable 800, road surface 750 may be cleared of debris. Various cleaning devices may be employed, for example, a brush sweeper, a water jet, a vacuum tube or a compressed air blower. The cleaning device can also be incorporated into a device for deploying the cable.

Cable 800, which can be any cable according to aspects of the disclosure, is typically stored on an industrial spool 876. Significant lengths of cable 800 may be stored on spool 876 that can be deployed onto a particular outdoor surface. In this example, spool 876 may be mounted onto a vehicle 878, but in other examples, any device capable of securing industrial spool 876 can be used. In still other examples, smaller spools or devices storing cable 800 may be used that can be carried by a single technician. As previously discussed, cable 800 can include a protective liner 836 overlying adhesive layer 816 of cable 800.

One end of cable 800 is deployed from spool 876 by pulling the end of cable 800 from spool 876, as shown in FIG. 14A. Cable 800 may be withdrawn from spool 876 manually, by a technician. Spool 876 may also be connected directly or wirelessly to a motor which allows for technician to control rotation of spool 876 and the speed at which cable 800 is withdrawn from spool 876. In one example, one end of cable 800 is threaded through a tool 881 handled by a technician 883. Supporting tool 881 may be an elongated tube that can be used to support cable 800 as it extends from a rear portion of vehicle 878. End 884 of tool 881 can be positioned near the desired surface onto which cable 800 will be deployed. As best seen in FIG. 14B, cable 800 is routed through an opening 886 in tool 881 near end 884 of tool 881. A liner separator 888 is positioned near opening 886 so that as cable 800 passes through opening 886, protective liner 836 is separated from adhesive layer 816 to expose adhesive layer 816. Liner separator may be any device used to separate or remove protective liner 836 from cable 800. For example, liner separator 888 may be a rigid object with an edge, such as a metal or plastic edge. As cable 800 is pulled through opening 886, protective liner 836 passes through opening 887, adhesive layer 816 makes contact with sidewalk 842. End 884 of tool 881 overlies cable 800 and may have a brush 889 or other mechanism that can apply pressure to cable 800 as it is deployed onto the sidewalk 842 or shortly after cable 800 has been deployed. Cable 800 can continue to be withdrawn from spool 876 until the desired length of cable 800 has been laid down.

It is to be appreciated that the same or similar methods can be used to apply cable 800 onto a sidewalk, a curb, or any other outdoor surface. Further, various methods can be used to pull or push cable 800 through tool 881 and for tool 881 to communicate with spool 876.

Although not required, prior to clearing debris from road surface 750, road surface 850 can be planarized to allow for deposition of fiber optic cable 700. Planarization can provide a substantially planar surface onto which cable 800 may be deployed and secured. Planarization can help to increase the surface area between adhesive layer 816 of cable 800 and the road surface 750. Planarization may remove only a minimal portion of road surface 750, such that a negligible amount of road surface 750 has been removed. In other examples, deeper recesses can be created during the planarization process, such as recesses previously disclosed herein. For example, as previously discussed, a shallow recess may be formed when it is desired for only a portion of cable 800 to be positioned with a recess. In other examples, a deeper recess may be formed to accommodate the entire height H of cable 800 or the overall height of a stacked arrangement of cables. In those examples where recesses are created, fill material may be used to fill in the spaces of the recess not occupied by cable 800.

With reference to FIG. 15, a flow diagram illustrating an example method 900 of deploying a cable that includes an adhesive backing layer according to aspects of the present disclosure onto an outer surface, such as a road surface, a sidewalk, or a curb.

At block 902, a surface is cleared of debris. For example, as previously discussed, various cleaning devices may be employed, for example, a brush sweeper, a water jet, a vacuum tube or a compressed air blower. The cleaning device can also be incorporated into a device or tool for deploying the cable.

At block 904, cable is withdrawn from a spool used to store significant lengths of cable. In one example, cable can be automatically withdrawn from a spool.

At block 906, the adhesive backing layer overlying the adhesive layer of the cable is removed. In one example, as cable is withdrawn from the spool, a liner protecting the adhesive layer is separated away from adhesive layer.

At block 908, the cable is placed onto the selected surface in the desired position. For example, the adhesive layer of the cable may be placed into contact with the surface in the desired position.

At block 910, pressure is applied to the cable. For example, pressure may be applied to the top surface of the cable to ensure a secure connection between adhesive layer of cable and the road surface. Pressure can be applied as the cable is being laid down or shortly thereafter.

Cable can continue to be withdrawn from the spool and blocks 904 through 910 can be repeated until the desired length of cable has been laid down.

FIG. 16A is flow diagram illustrating another example method 912 for deploying a cable that includes an adhesive backing layer according to aspects of the present disclosure onto an outer surface, such as a road surface, a sidewalk, or a curb. At block 914, the surface is planarized to the desired width and depth to ensure a smooth surface. In one example, a recess is formed that is sized to receive the entire cable width and height. In other examples, a recess may be sized to receive less than the overall height H of the cable.

At block 916, the surface onto which the cable will be deployed is cleared of debris. In this example, an intermediate surface within the recess created during planarization will be cleared.

Blocks 918 to 924 are similar to blocks 904 to 910 discussed in FIG. 15. At block 926, the recess may be filled with filler material. For example, any portions of recess that are not occupied by the cable may be filled with filler material, such as rocks, gravel and sand. Recess may be filled as the cable is being laid down or filler may be provided only after all of the cable has been laid down. A sealant may also be provided, if necessary.

Figure 16B:
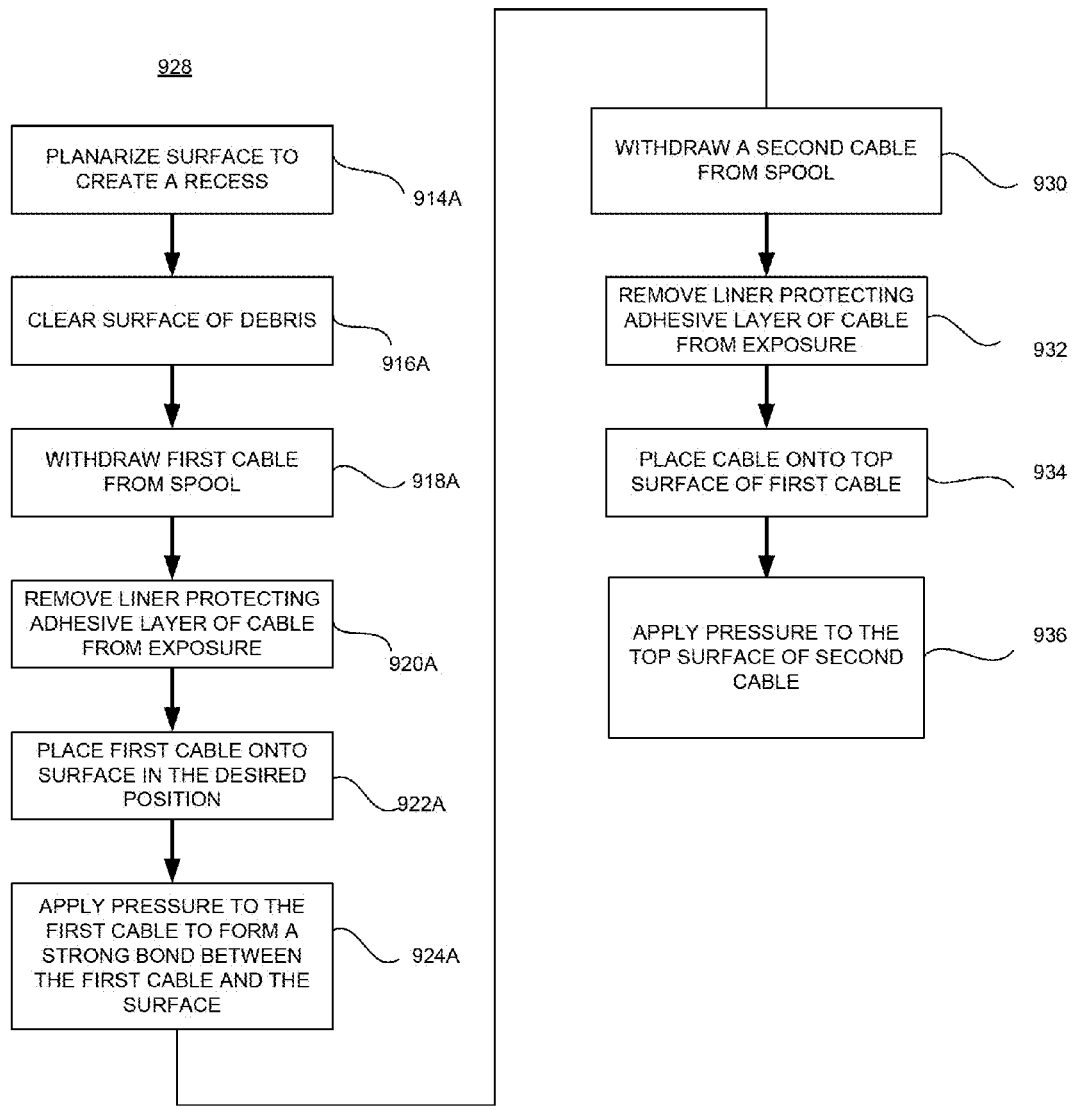
FIG. 16B is a flow chart illustrating a method of forming a stacked cable arrangement according to aspects of the disclosure.

FIG. 16B is an example 928 method of forming a stacked cable arrangement, such as the stacked arrangement disclosed in FIGS. 10-11. Blocks 914A-924A are similar to blocks 914-924 discussed in FIG. 16B. After block 924A, at block 930, a second cable configured according to aspects of the disclosure is withdrawn from the spool. The second cable can be from the same spool used to obtain the first cable, or it can be obtained from an entirely different spool. The second cable may also be similar in structure to the first cable or it may differ. Second cable will include at least an adhesive layer, such as previously discussed herein. The adhesive layer may be protected with a liner or protective covering that prevents adhesive layer from being prematurely exposed and losing its ability to adhere to a surface or substantially reducing its ability to adhere to a surface.

At block 932, a liner or protective covering overlying the adhesive layer is removed away the adhesive layer. For example, the liner may be manually removed by a technician as the cable is laid down or a device may be used to remove the liner as the second cable is laid down.

At block 934, the second cable is placed on top of the first cable. For example, the adhesive layer of the second cable can be placed into contact with top surface of first cable. Second cable can be aligned with the first cable so that the exposed outer edges of the first and second cables are aligned with one another.

At block 936, pressure is applied to the top surface of the second cable. For example, the technician can manually apply pressure or a secondary device may be used to apply pressure to the top surface of the second cable.

Figure 17A:
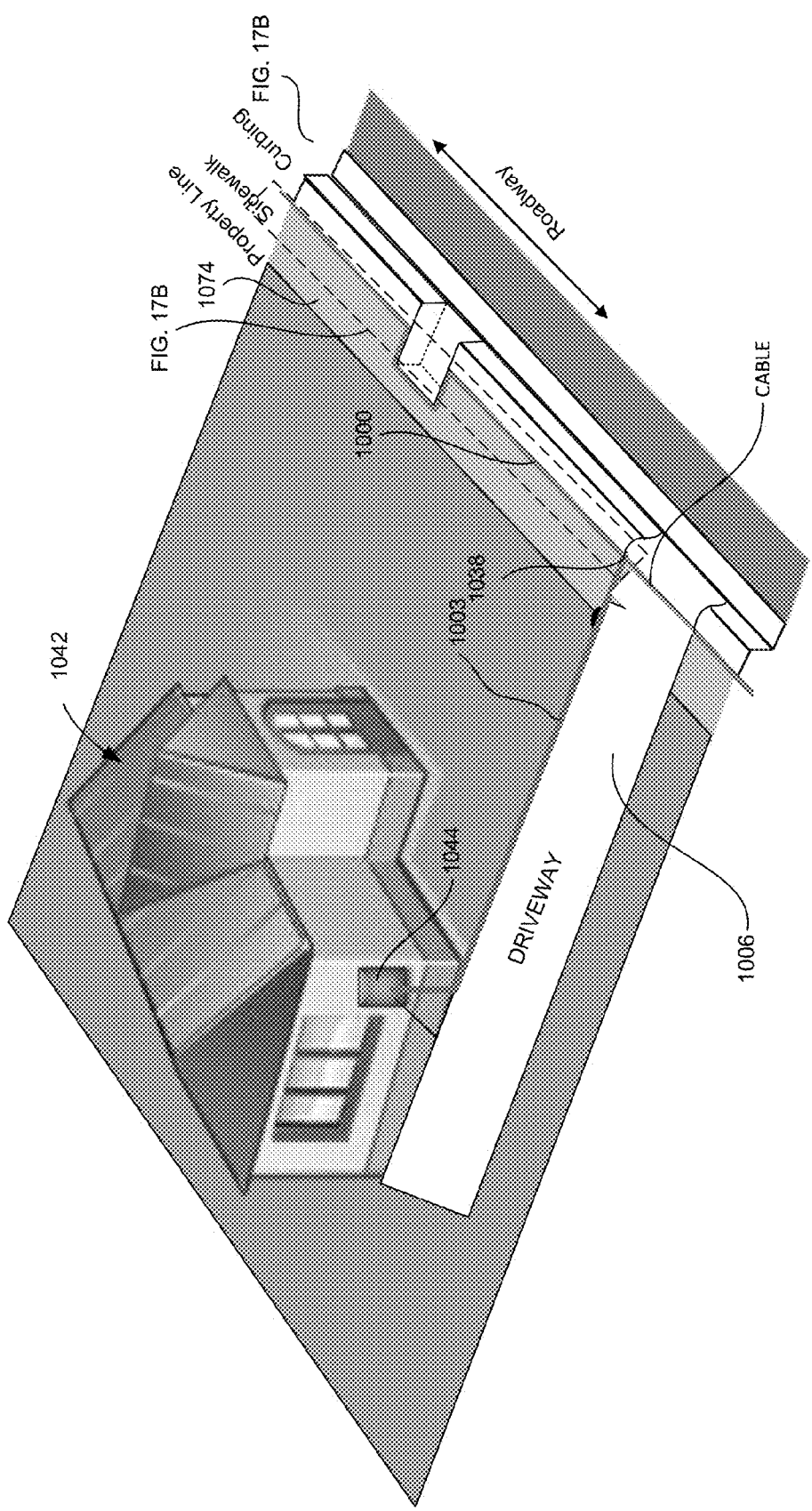
FIG. 17A is a schematic illustrating a lateral connection between example cable according to aspects of the disclosure and a terminal.

Lateral connections can extend from a cable configured according to aspects of the disclosure to an external connection point. For example, with reference to FIG. 17A, a lateral connection can be formed between an Optical Network Terminal ("ONT") 1044 of a residential home 1042 or the like and a first cable 1000. In this example, first cable 1000 is similar to cable 200 disclosed in FIG. 5, but any other cable constructed according to the present disclosure may be utilized. First cable 1000 includes an adhesive layer 1016 that is secured to a top surface 1070 of sidewalk 1054 according to methods disclosed herein. At least one optical fiber unit housed within first cable 1000 can be separated from the first cable 1000 and connected to ONT 1044.

A second cable 1003 can be deployed to house fiber optic units that are withdrawn from first cable 1000 to form a lateral connection. In one example, second cable 1003 is similar to cable 400 disclosed in FIG. 9 and includes a central microduct 1001. Second cable 1003 can be deployed onto a surface of driveway 1006 using methods previously discussed herein. For example, second cable 1003 may be deployed directly onto the top surface of driveway 1061 or an edge surface of driveway 1061. In this example, second cable 1003 overlies a top surface of driveway and extends in a direction that is generally perpendicular to first cable 1000, which has been deployed directly onto a sidewalk 1074. Intersection 1038 is formed at the point where first and second cables 1000,1003 meet.

Figure 17B:
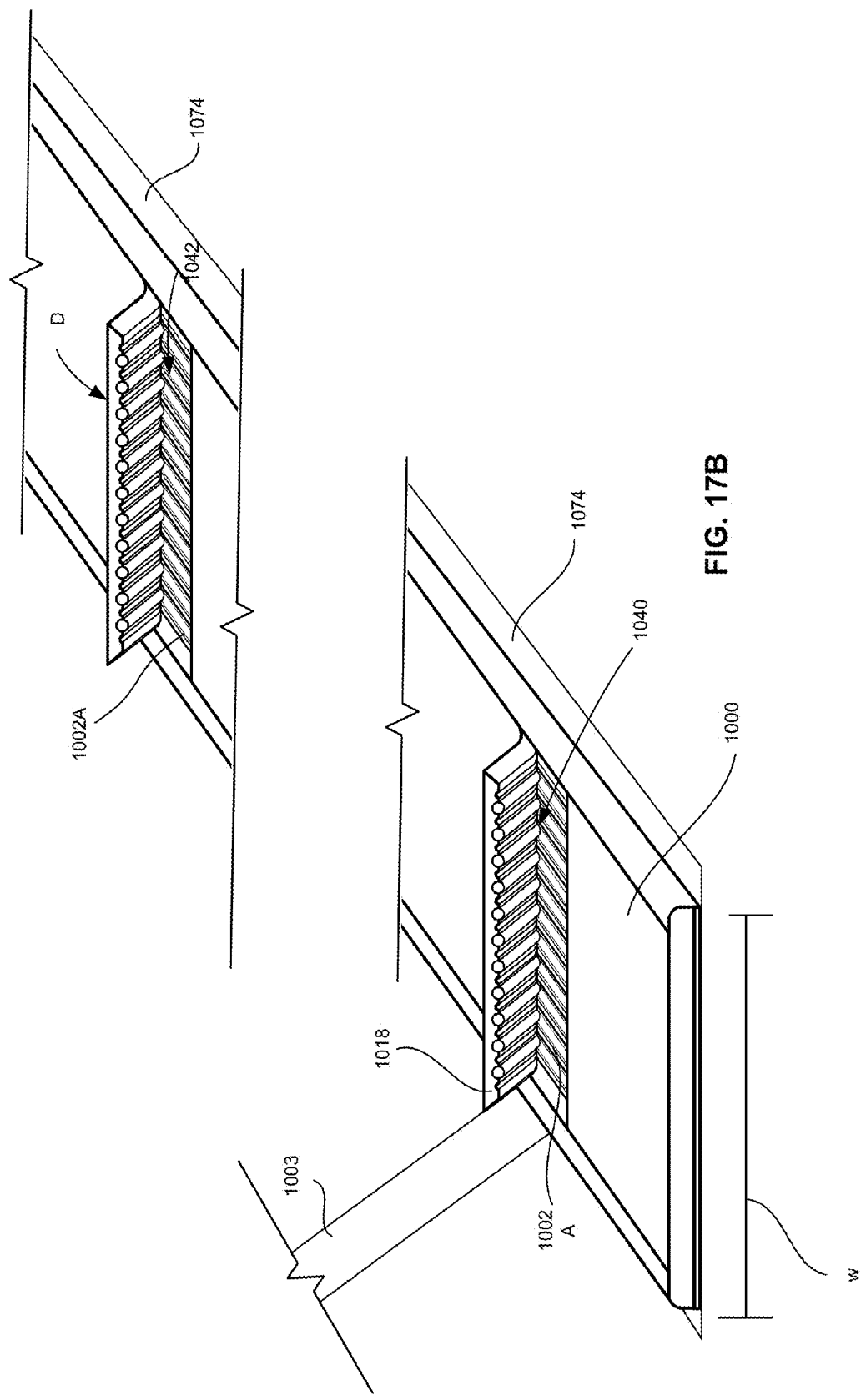
FIG. 17B is an enlarged portion of FIG. 17A.

To form the lateral connection, fiber optic units must be withdrawn from first cable 1000 and routed through second cable 1003. In one example, as best shown in FIG. 17B, an enlarged portion of FIG. 17A, access layer 1018 of cable 1000 can be pulled away to create a first opening 1040 that provides access to fiber optic units 1002 within first cable 1000. As previously discussed, fiber optic units 1002 can include, at least one fiber optic strand and an outer jacket. A first cut may be made across the access layer in a direction across width W of first cable 1000. Access layer 1018 may be pulled away from the remainder of first cable 1000 to expose optical fiber units 1002 within first cable 1000. In this example, pulling access layer 1018 away from body of first cable 1000 also pulls up intermediate strength members 1015 within first cable 1000, so that fiber optic units 1002 are accessible. One of the exposed fiber optic units 1002 is then selected to form a lateral connection between the cable and the connection point.

One end of a fiber optic unit must be freed to form the lateral connection. In one example, as best shown in FIG. 17B, first cable 1000 is cut further downstream at point D in a direction of the width W of cable 1000. A second opening 1042 in cable 1000 is created when access layer 1018 is opened to gain access to fiber optic unit 1002A downstream. Fiber optic unit 1002A is then cut downstream. Fiber optic unit 1002A can then be pulled at the first opening 1040 until the cut end of fiber optic unit 1002 is free of cable 1000.

The freed fiber optic unit 1002 is then connected with ONT 1044. In one example, the freed fiber optic unit 1002A may be blown through the microduct 1001 of second cable 1003. The end of the fiber optic unit 1002 may then be connected to the ONT 1044.

It is to be appreciated that lateral connections can be formed from a cable that has been deployed onto any surface, including a road surface, a curb, and the like.

Figure 18:
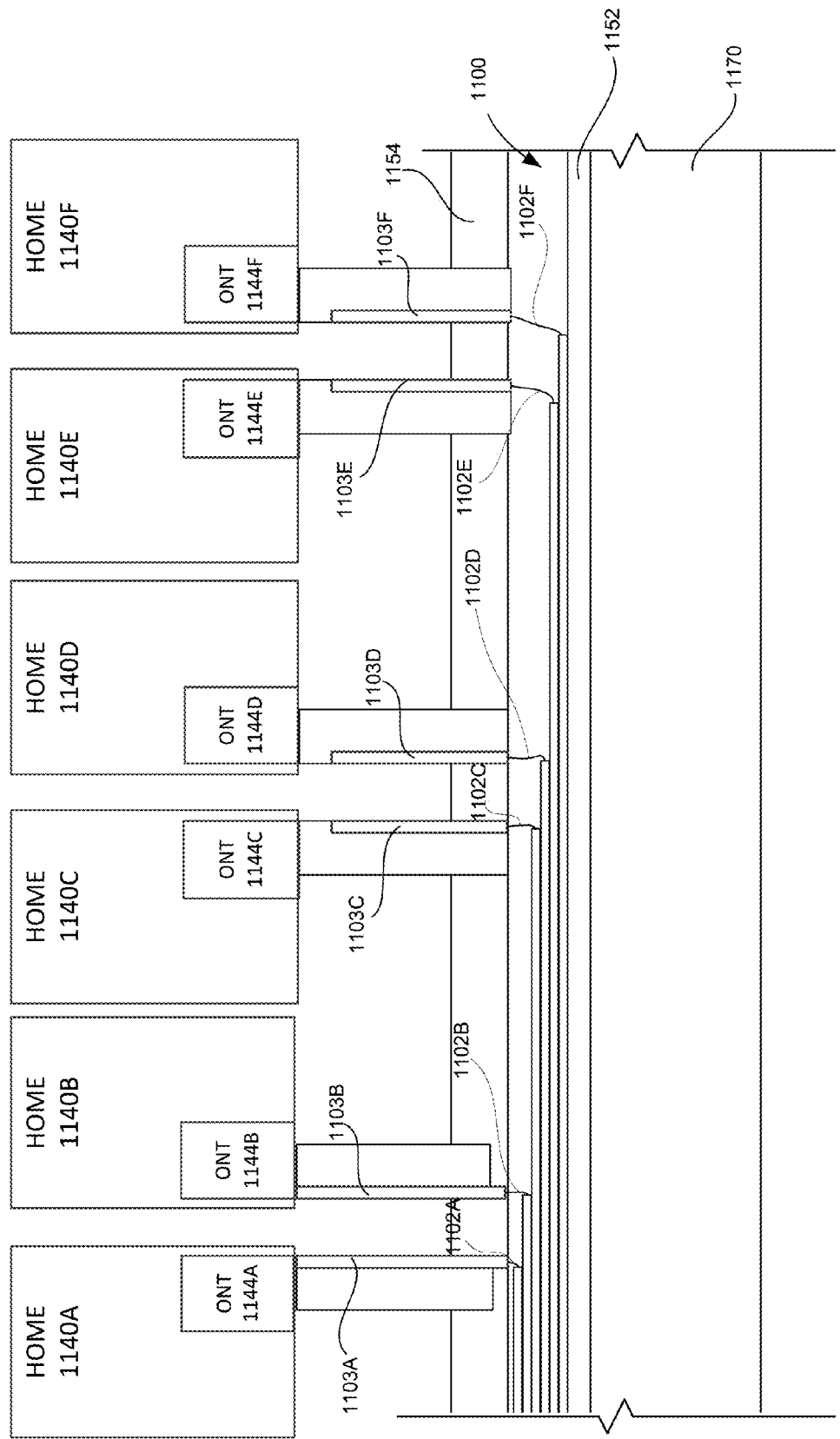
FIG. 18 is another schematic illustrating installation of example cables according to aspects of the disclosure.

FIG. 18 illustrates a schematic example of a network of lateral connections formed between a first primary cable and several secondary cables extending laterally from the first primary cable. As shown, FIG. 18 includes a first primary cable 1100; six houses (1140A, 1140B, 1140C, 1140D, 1140E,1140F); a sidewalk 1154, a curb 1152, road surface 1170 and second cables (1103A, 1103B, 1103C, 1103D, 1103E, 1103F). Each house may have its own optical network terminal (ONT) as shown by ONT 1144A, 1144B, 1144C, 1144D, 1144E,1144F.

A technician may begin separating the fiber optic units from first cable 1100 to provide a communication channel between an access terminal and each of the ONTs. For example, first fiber optic unit 1102A may be separated from first cable 1100 and blown through second cable 1103A. Fiber optic unit 1102A connects the first cable 1100 to ONT 1144A to provide a communication channel for customer home 1140A. The process may be repeated for the remaining homes. For example, fiber optic units 1102B, 1102C, 1102C, 1102D, 1102E, 1102F may be withdrawn from cable 1100 and blown through respective second cables 1103A, 1103B, to connect with respective ONTs 1144B, 1144C, 1144D, 1144E, 1144F.

Figure 19:
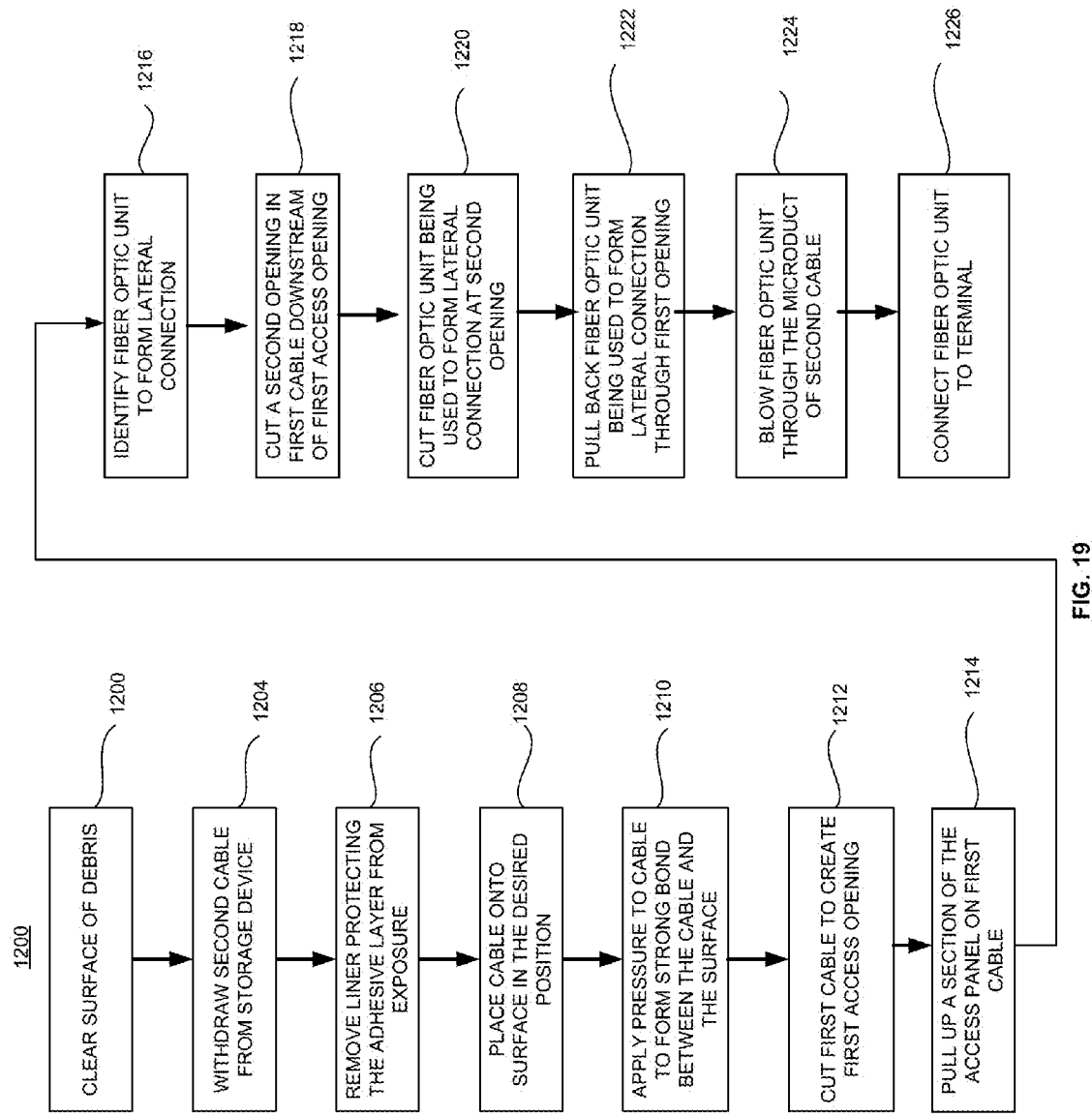
FIG. 19 is a flow chart illustrating an example method for forming a lateral cable connection between example cables and a terminal according to aspects of the disclosure.

With reference to FIG. 19, a flow chart illustrates an example method 1200 of forming a lateral connection between a primary cable and an exterior connection point. In this example, it is to be assumed that a primary or first cable carrying a plurality of fiber optic units has already been laid down on a surface, such as a road, curb or sidewalk and that it is desired to extend a connection from the first cable to a residence. In one example, the primary cable has been laid down onto a sidewalk using the method disclosed in FIG. 15.

At block 1202, a surface may be cleared of debris. For example, the driveway onto which a second cable will be deployed can be cleared using any number of devices, as previously discussed herein.

At block 1204, cable may be withdrawn from a storage device. For example, the second cable may be stored on an industrial spool, requiring the second cable to be unwound and withdrawn from the spool. In this example, the cable will include at least one microduct, such that when the second cable is laid down, there will be no optical fibers present within the second cable.

At block 1206, a liner is removed from the second cable as previously discussed herein.

At block 1208, the second cable is placed onto the surface in the desired position. In this example, the cable will be deployed directly onto the driveway surface. The second cable may run in a direction that is generally perpendicular to the direction in which the first cable extends. In other examples, the second cable can run at any angle relative to the first cable.

At block 1210, pressure can be applied to the second cable to secure the second cable to the surface. In this example, the pressure can be applied to the top surface of the second cable.

At block 1212, the first cable is cut to create a first access opening. For example, a shallow cut may be made through the access layer of the first cable in a direction across the width of the cable.

At block 1214, a section of the access layer can be pulled up. For example, the access layer can be pulled up at the opening to expose the fiber optic units therein.

At block 1216, the fiber optic unit that will be used to form a lateral connection is identified. For example, when the access layer is pulled up, the interior portion of first cable is exposed. A technician can identify the fiber optic unit that will be used to form a connection to a residence or the like.

At block 1218, the first cable is cut at a second location to create a second access opening. For example, another shallow cut may be made through the access layer of the first cable in a direction across the width of the cable to expose the fiber optic units therein. The cut should be deep enough to allow the access layer to be pulled up without damaging the underlying optical fiber units.

At block 1220, the fiber optic unit that will be used to form the lateral connection is cut at the second access opening so that the selected fiber optic unit has a free end.

At block 1222, the fiber optic unit is pulled back through the first access opening. For example, the fiber optic unit is pulled out of the first access opening until the free end of the fiber optic unit is positioned outside of the cable housing.

At block 1224, the freed fiber optic unit may then be blown through the second cable. For example, the fiber optic unit may be blown through the microduct in the second cable.

At block 1226, the fiber optic unit is connected to a terminal of a residence or the like.

It is to be further appreciated that while the examples described herein refer to fiber optic cables, one of ordinary skill in the art would recognize the applicability of the examples described herein to other types of cables, such as communication cables, coaxial cables, power cables, phone lines, etc. Furthermore, it should be appreciated that the cables and methods of deploying the cables according to aspects of the disclosure can be deployed onto interior surfaces, as well, such as the interior walls or ducts of a building.

In the examples discussed above, relative positions such as lateral, longitudinal, horizontal, vertical, and the like are used for reference only and are not intended to be limiting with respect to particular positions of the elements they are used to describe. Additionally, while particular methods are described and shown in a specific order in the appended drawings, such methods are not limited to any particular order unless such order is expressly set forth herein. Furthermore, additional steps may be added and one or more disclosed steps omitted.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same or similar reference numbers in different drawings can identify the same or similar elements.

The invention claimed is:

1. A cable, comprising:
   an outer housing having a planar bottom surface extending along a width of the outer housing;
   a plurality of optical fibers within the outer housing and arranged in parallel with one another along the width of the cable;
   a removably attached access layer providing access to the plurality of optical fibers, the removably attached access layer forming a first portion of the outer housing and having a shape complementary to a second portion of the outer housing from which the access layer can be separated; and
   a plurality of strength members, wherein the strength members are secured to the access layer such that when the access layer is moved from a closed position to an open position, the strength members are moved away from a remainder of the outer housing,
   wherein strength members of the plurality of strength members are disposed between each of the optical fibers.

2. The cable of claim 1, further comprising an adhesive layer disposed at the bottom surface of the outer housing, the adhesive layer comprised of a material configured to secure the cable to a surface exposed to an outside environment.

3. The cable of claim 1, wherein first and second outer strength members are disposed within the outer housing such that the plurality of optical fibers are disposed between the first and second outer strength members.

4. The cable of claim 3, wherein a distance between a top and bottom surface of the second portion of the outer housing is greater adjacent to the first and second outer strength members than a portion of the outer housing adjacent to the optical fibers.

5. The cable of claim 1, wherein the plurality of strength members are comprised of resin embedded with glass fibers or synthetic aramid fibers.

6. The cable of claim 1, wherein the access layer is configured to move from the closed position to the open position where the access layer is moved away from the first portion of the outer housing, wherein the optical fibers are exposed when the access layer is in the open position.

7. The cable of claim 1, wherein a cross-section of the access layer across the width of the outer housing comprises a shape of a trapezoid.

8. The cable of claim 2, wherein the adhesive layer is a first adhesive layer, and the access layer includes a second adhesive layer that allows for the access layer to be moved back and forth between the closed position and the open position, wherein the access layer is secured to the outer housing in the closed position.

9. The cable of claim 2, wherein the adhesive layer is a first adhesive layer, and the access layer is secured to the outer housing by a second adhesive layer.

10. The cable of claim 1, wherein the plurality of optical fibers include at least twelve fibers.

11. The cable of claim 1, wherein the cable further comprises microducts and the optical fibers are positioned within microducts.

12. A method of deploying a cable onto a surface exposed to an outside environment comprising:
    removing a liner overlying a first adhesive layer of the cable to expose the first adhesive layer;
    placing the first adhesive layer into contact with the surface; and
    applying pressure to the cable to secure the cable to the surface,
    wherein the cable comprises:
    an outer housing having a planar bottom surface extending along a width of the outer housing;
    a plurality of optical fibers within the outer housing and arranged in parallel with one another along the width of the cable;
    a removably attached access layer providing access to the plurality of optical fibers, the removably attached access layer forming a first portion of the outer housing and having a shape complementary to a second portion of the outer housing from which the access layer can be separated; and
    a plurality of strength members, wherein the strength members are secured to the access layer such that when the access layer is moved from a closed position to an open position, the strength members are moved away from a remainder of the outer housing, while still being secured to the access layer,
    wherein the first adhesive layer is disposed at the bottom surface of the outer housing and the first adhesive layer is comprised of a material configured to secure the cable to a surface exposed to an outside environment, and
    wherein the optical fibers and the strength members are staggered such that central axes of the strength members and central axes of the optical fibers are not aligned.

13. The method of claim 12, wherein the cable is a first cable, the method further comprising:
    exposing a second adhesive layer disposed at a bottom surface of a second cable, the second cable housing a second plurality of second optical fibers; and
    securing the second adhesive layer of the second cable to a top surface of the first cable.

14. The method of claim 13, wherein exposing a second adhesive layer includes removing a second adhesive backing liner from the bottom surface of the second cable to expose the second adhesive layer.

15. The method of claim 13, wherein the first cable is deposited at the same time a first adhesive backing liner is removed.

16. The method of claim 13, wherein the first cable and the second cable are cut from a same primary cable.

17. The method of claim 12, wherein the cable is a first cable, the method further comprising:
    exposing a second adhesive layer disposed at a bottom surface of a second cable, the second cable housing a microduct;
    positioning the second cable in a direction extending away from the first cable; and
    blowing one of the plurality of optical fibers in the first cable through the microduct.

18. The method of claim 17, wherein prior to blowing, the access layer of the first cable is in an open position so as to provide access to the one of the plurality of optical fibers within the outer housing.

19. The method of claim 11, wherein a circumference of each of the plurality of strength members is greater than a circumference of each of the microducts.

20. The method of claim 17, wherein a circumference of each of the plurality of strength members is greater than a circumference of each of the microducts.

\* \* \* \* \*